(12) United States Patent
Biggs et al.

(10) Patent No.: US 10,021,080 B2
(45) Date of Patent: *Jul. 10, 2018

(54) GROUP MEMBERSHIP BLOCK CHAIN

(71) Applicant: Cisco Technology, Inc., San Jose, CA (US)

(72) Inventors: Andrew Biggs, Thornton, CO (US); Shaun Cooley, El Segundo, CA (US); Matt Miller, Denver, CO (US); Sean Whitsell, Chapel Hill, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/830,291

(22) Filed: Dec. 4, 2017

(65) Prior Publication Data

US 2018/0091489 A1 Mar. 29, 2018

Related U.S. Application Data

(63) Continuation of application No. 14/943,184, filed on Nov. 17, 2015, now Pat. No. 9,871,775.

(60) Provisional application No. 62/202,950, filed on Aug. 10, 2015.

(51) Int. Cl.
| | |
|---|---|
| *H04L 29/06* | (2006.01) |
| *H04L 12/58* | (2006.01) |
| *H04L 9/32* | (2006.01) |
| *H04L 9/08* | (2006.01) |

(52) U.S. Cl.
CPC .......... *H04L 63/065* (2013.01); *H04L 9/0833* (2013.01); *H04L 9/3242* (2013.01); *H04L 9/3255* (2013.01); *H04L 51/04* (2013.01); *H04L 63/0435* (2013.01); *H04L 63/123* (2013.01)

(58) Field of Classification Search
CPC . H04L 63/065; H04L 63/123; H04L 63/0435; H04L 9/3242; H04L 51/04; H04L 9/0833; H04L 9/3255
See application file for complete search history.

(56) References Cited

U.S. PATENT DOCUMENTS

| | | | |
|---|---|---|---|
| 5,220,604 | A | 6/1993 | Gasser et al. |
| 7,185,199 | B2 | 2/2007 | Balfanz et al. |
| 7,397,922 | B2 | 7/2008 | Gavrilescu et al. |
| 7,783,043 | B1 | 8/2010 | Dondeti |
| 8,848,921 | B2 | 9/2014 | Tang et al. |

(Continued)

OTHER PUBLICATIONS

Michael K. Reiter, "A Secure Group Membership Protocol", IEEE Transactions on Software Engineering, vol. 22, No. 1, Jan. 1996, 12 pages.

(Continued)

*Primary Examiner* — John B King
(74) *Attorney, Agent, or Firm* — Edell, Shapiro & Finnan, LLC

(57) ABSTRACT

A system and method for achieving authorization in confidential group communications in terms of an ordered list of data blocks representing a tamper-resistant chronological account of group membership updates. This method permits ad-hoc and decentralized group definition, dynamic and decentralized membership updates, open sharing, tamper resistance, and tracking of membership history. There are many applications of these techniques. One such application is enabling end-to-end encryption of instant messaging, content sharing, and streamed media.

20 Claims, 25 Drawing Sheets

(56) References Cited

U.S. PATENT DOCUMENTS

| | | |
|---|---|---|
| 9,071,588 B2 | 6/2015 | Dondeti |
| 9,094,417 B2 | 7/2015 | Everhart et al. |
| 9,137,020 B1 | 9/2015 | Fraser |
| 2012/0096564 A1 | 4/2012 | Li |
| 2013/0339160 A1 | 12/2013 | Avery et al. |
| 2014/0280522 A1 | 9/2014 | Watte |
| 2015/0294308 A1 | 10/2015 | Pauker et al. |
| 2016/0027229 A1 | 1/2016 | Spanos et al. |
| 2016/0028552 A1 | 1/2016 | Spanos et al. |
| 2016/0260171 A1 | 9/2016 | Ford et al. |
| 2016/0275461 A1 | 9/2016 | Sprague et al. |
| 2017/0048217 A1 | 2/2017 | Biggs et al. |
| 2017/0048234 A1 | 2/2017 | Lohe et al. |
| 2017/0052676 A1 | 2/2017 | Pulier et al. |
| 2017/0116693 A1 | 4/2017 | Rae et al. |
| 2017/0221029 A1 | 8/2017 | Lund et al. |
| 2017/0242475 A1 | 8/2017 | Gilboa et al. |

OTHER PUBLICATIONS

D. Wallner et al., "Key Management for Multicast: Issues and Architectures", RFC 2627, National Security Agency, 1999, 23 pages.

International Search Report and Written Opinion in counterpart International Application No. PCT/US2016/045962, dated Nov. 9, 2016, 11 pages.

Raluca Ada Popa, et al., "Enabling Security in Cloud Storage SLAs with CloudProof", in USENIX Annual Conference Technical (vol. 242), Jun. 2011, 14 pages.

Mahesh Kallahalla, et al., "Plutus: Scalable secure file sharing on untrusted storage", Proceedings of FAST '03: 2nd USENIX Conference on File and Storage Technologies, San Francisco, CA, USA, Mar. 31-Apr. 2, 2003, 15 pages.

S. Cooley, "Primitives for Confidential Group Communications" draft-abiggs-saag-primitives-for-conf-group-comms-00, Internet-Draft, Cisco Systems, Sep. 13, 2015, 15 pages.

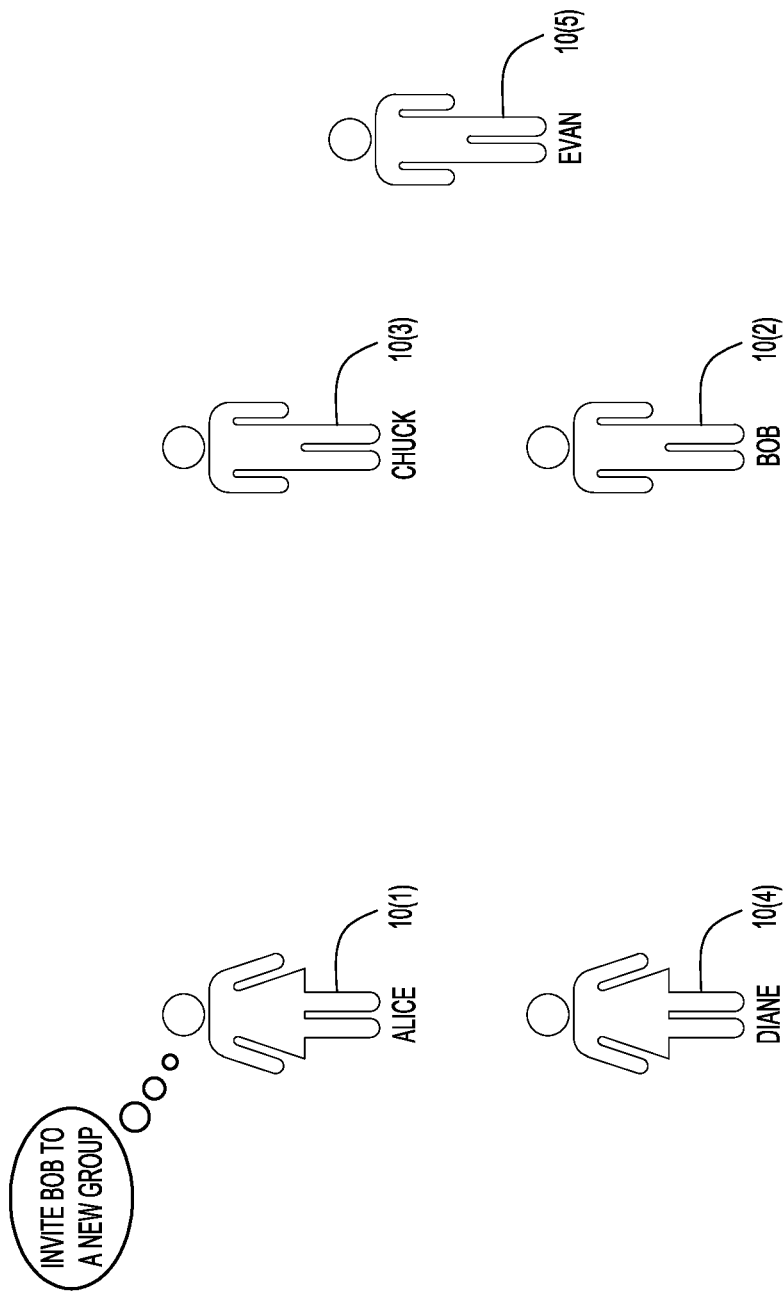

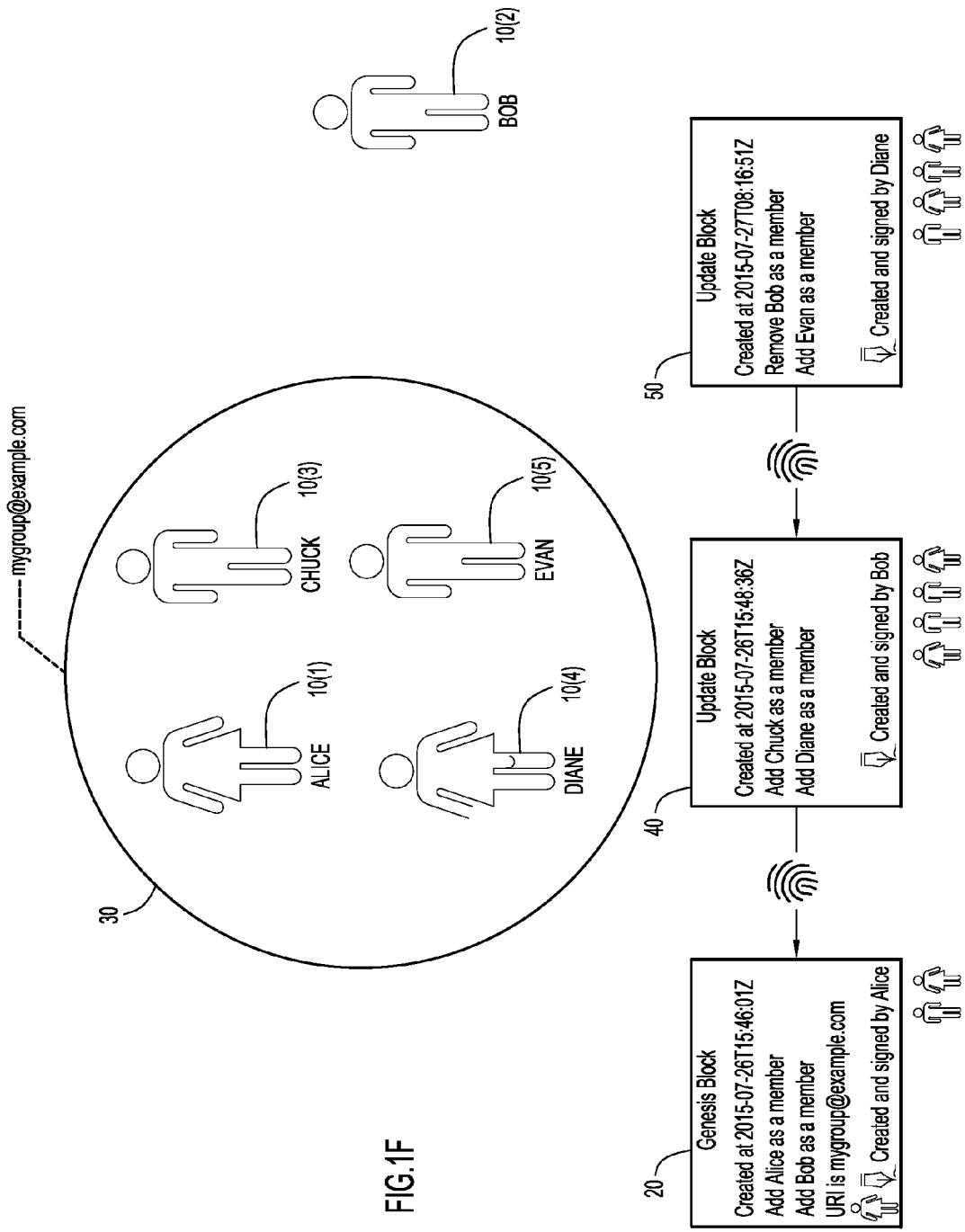

VALID BLOCK CHAIN

INCORRECT OR MISSING HASH OF PREVIOUS BLOCK

INVALID SIGNATURE ON BLOCK

UPDATE BY NON-MEMBER

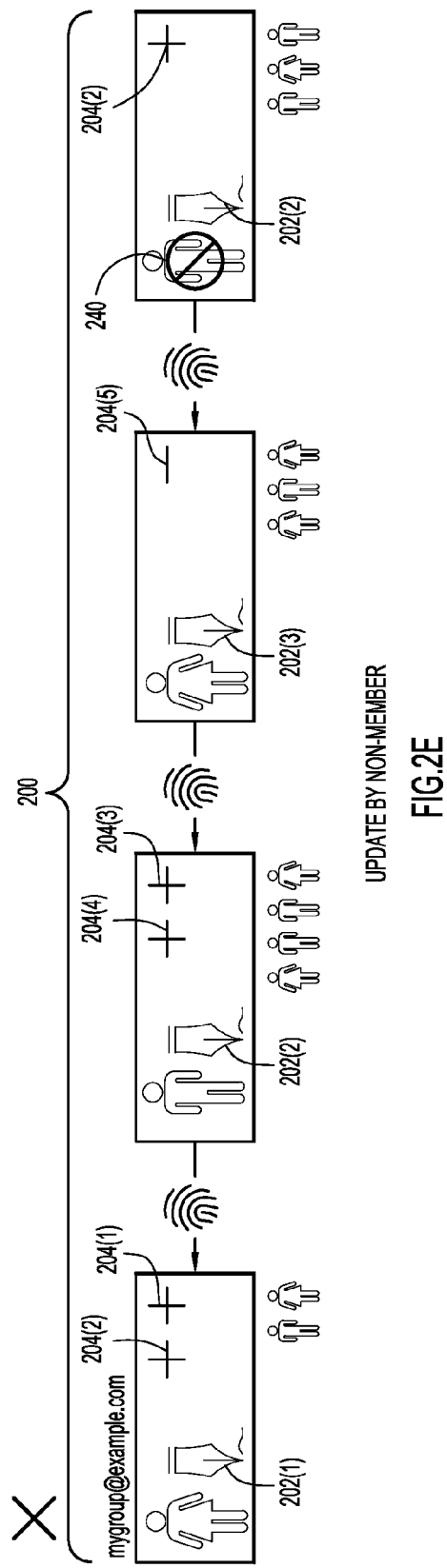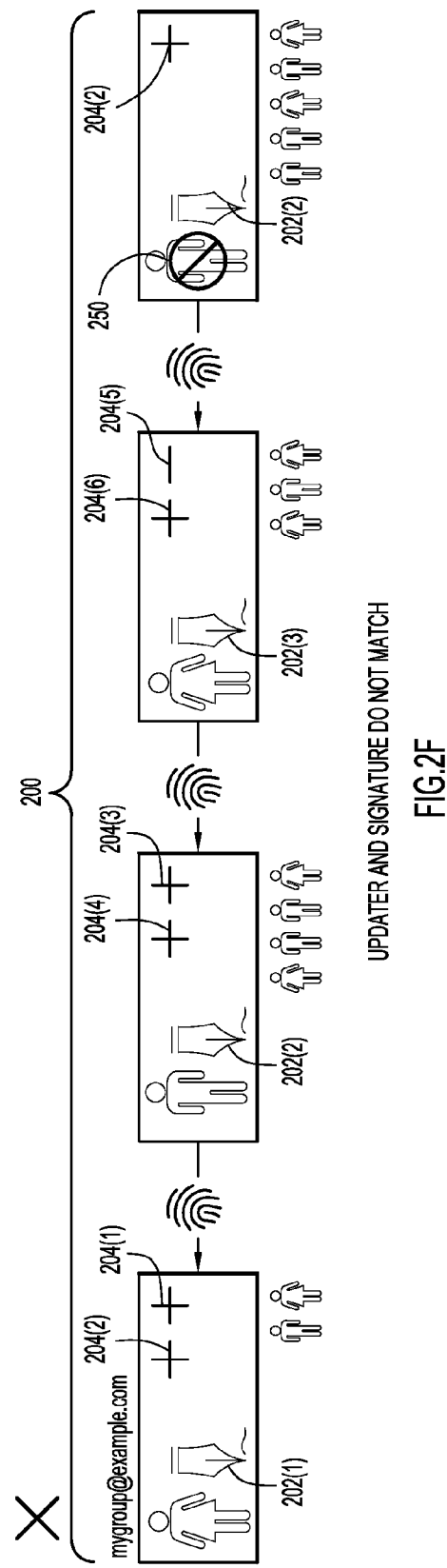

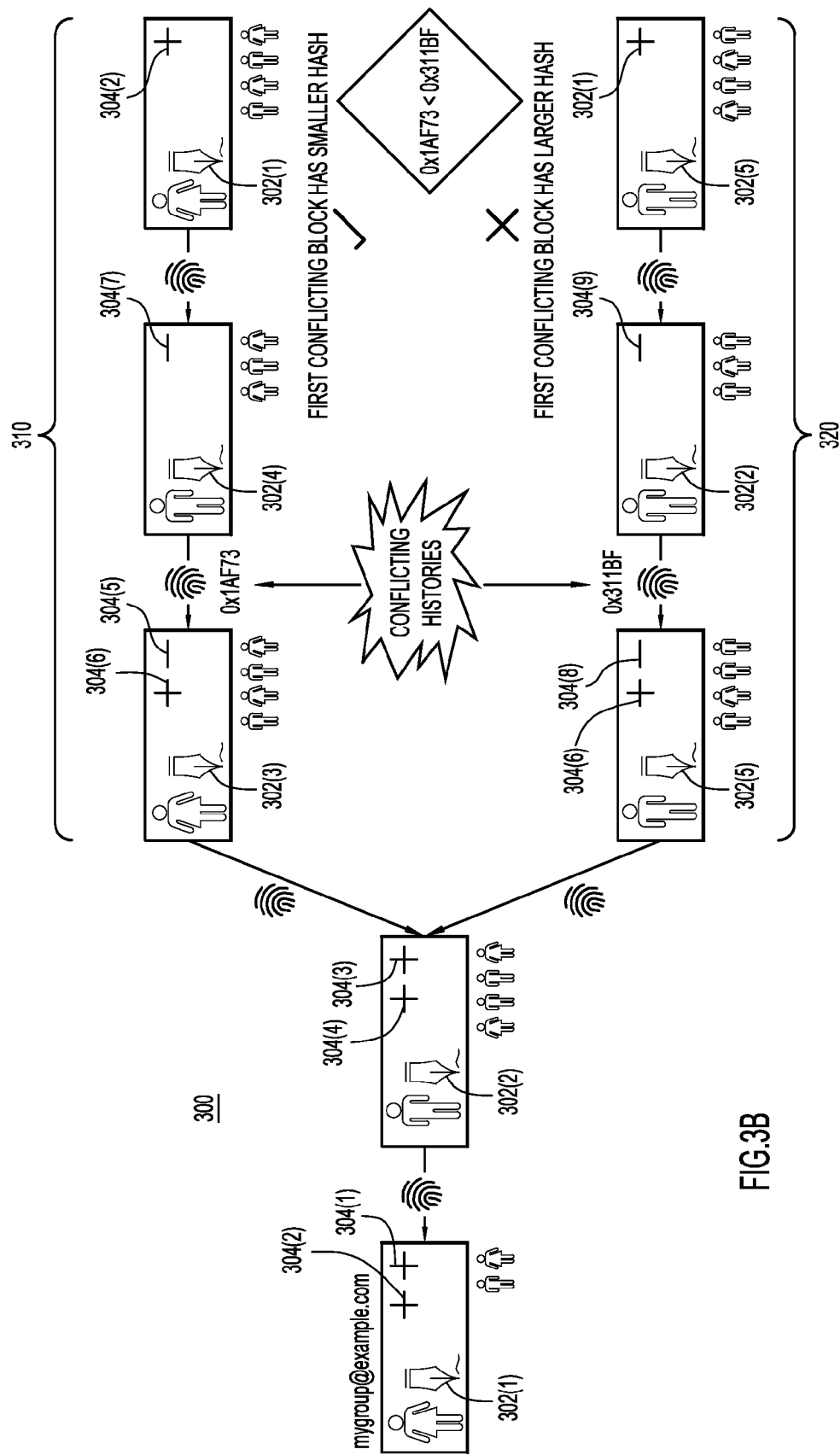

FIRST CONFLICTING BLOCK HAS SMALLER HASH

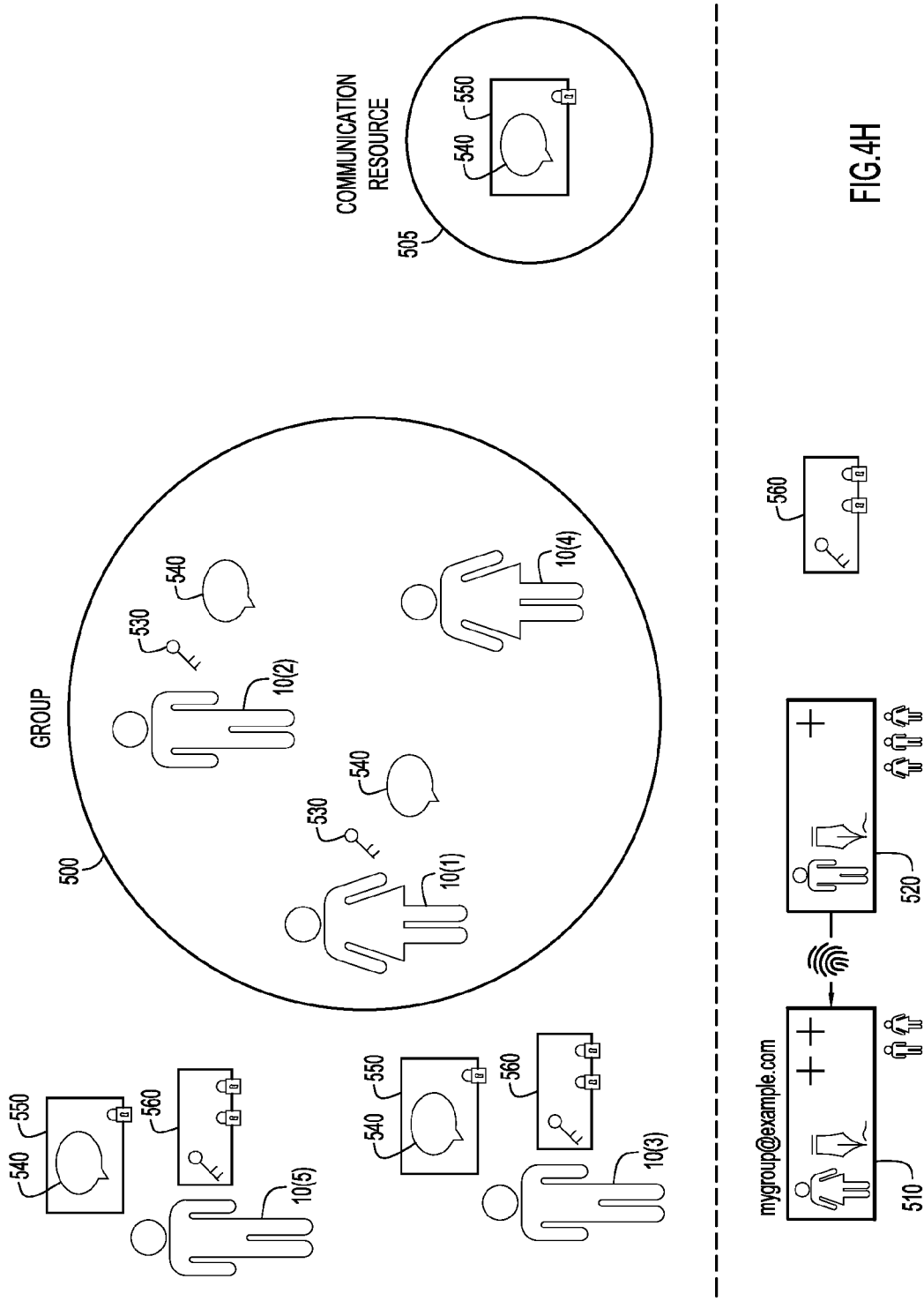

GROUP MEMBERSHIP BLOCK CHAIN

CROSS REFERENCE TO RELATED APPLICATIONS

This application is a continuation of U.S. application Ser. No. 14/943,184, filed Nov. 17, 2015, which in turn claims priority to U.S. Provisional Application No. 62/202,950, filed Aug. 10, 2015, the entirety of which is incorporated herein by reference.

TECHNICAL FIELD

The present disclosure relates to confidential group communication.

BACKGROUND

Confidential group communication typically depends on the sharing of cryptographic key material among a group of authorized entities. There are a variety of ways in which keys may be shared among multiple entities, however, all such mechanisms depend on a common and reliable understanding of authorization, or group membership. How group membership is established, communicated, updated, and secured from unauthorized tampering are common problems for which a construct is not available that can be effective in the context of dynamic, decentralized, and self-organizing groups.

BRIEF DESCRIPTION OF THE DRAWINGS

FIGS. 1A-1H illustrate an example scenario to which group membership block chain techniques presented herein may be used, according to an example embodiment.

FIGS. 2B-2F illustrate examples of errors or invalid conditions in a group membership block chain, according to an example embodiment.

FIGS. 3A-3C illustrate an example of resolving a conflict in a group membership block chain, according to an example embodiment.

FIGS. 4A-4I illustrate an example of a group key used in accordance with the group membership techniques, according to an example embodiment.

DESCRIPTION OF EXAMPLE EMBODIMENTS

Overview

Figure 1B:
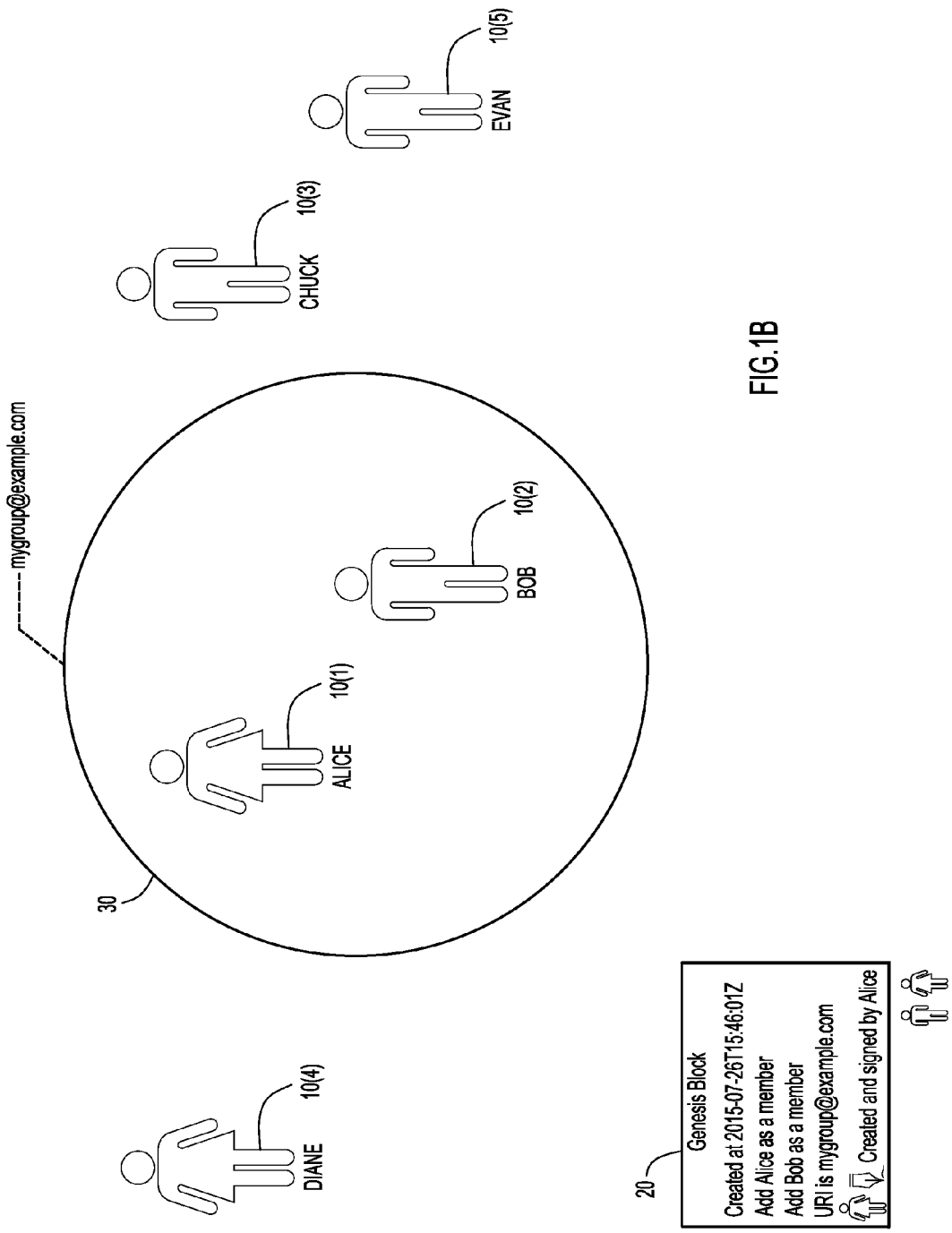

Presented herein is a system and method for modeling authorization in confidential group communications in terms of an ordered list of data blocks representing a tamper-resistant chronological account of group membership updates. This method permits ad-hoc and decentralized group definition, dynamic and decentralized membership updates, open sharing, tamper resistance, and tracking of membership history. There are many applications of these techniques. One such application is enabling end-to-end encryption of instant messaging, content sharing, and streamed media.

In one form, a method is provided to enable confidential communication among users who are members of a group. At a first device associated with a first user who is a member of the group, the following operations are performed. A first data block is generated for an ordered list of data blocks representing a chronological account of group member updates to the group, the first data block including a timestamp of creation of the first data block, identity information of the first user, information specifying addition of at least a second user to be a member to the group, and information pointing to a location of encrypted content to be shared among members of the group, the encrypted content having been encrypted with a symmetric key of the first user. A group key is generated that includes a hash of the first data block. Key material portion of the group key is encrypted using a multi-recipient encryption process that indicates at least the second user as a recipient. The ordered list and the group key are communicated to a communication resource to which a device of the second user has access. The information pointing to the location of the encrypted content and information pointing to the ordered list and the group key are sent to the device of the second user.

DETAILED DESCRIPTION

According to an embodiment, a Group Membership Block Chain (GMBC) is an ordered list of data blocks representing a tamper-resistant chronological account of group membership updates. The first block in the GMBC defines the initial set of group members and each subsequent block represents an addition/removal of one or more other entities to/from the group. Any entity can create a new GMBC, but only a member may update an existing GMBC by appending new blocks to it. To guard against tampering, each block contains a hash of the previous block and is signed with the private key of the entity that appended the block to the chain.

The GMBC serves as a sharable ledger of group membership over time. It achieves verifiable membership policy enforcement, tamper-proofing based on public key authentication, supports zero-conflict centralized topologies, and supports conflict-resolution in decentralized topologies. A group is a set of entities whose members wish to engage in secure and authenticated multiparty communications over some group communications resource. A group communications resource is any uniquely identifiable streamed or discrete data path that represents an exchange of personal communications between two or more entities. A GMBC can be used for any environment that requires the secure definition of a group, such as an access control list, etc. The example presented herein for the use in managing encryption keys is only by way of example and is not meant to be limiting.

The membership of the group is implicit and may be determined by processing the GMBC in chronological order. At any given point in time, the membership of the group is defined as that set of entities for which there exists, for each entity, a previously introduced block containing an "add" operation, and for which there does not exist a subsequent block containing a "remove" operation appended prior to the point in time of interest.

The GMBC is validated by verifying the signatures of each block, verifying that each block contains a valid hash of the preceding block, and verifying that each block was created and signed by an entity that is among the group's membership as determined by the segment of chain preceding that block.

The resulting construct supports decentralized ad-hoc group definition, is open to direct modification by any existing member, is closed to modification by any non-member, maintains explicit membership history, is openly sharable in cases where membership itself is not confidential, and allows entities to create groups to which they themselves do not belong.

In one example, each block in the GMBC consists of a JavaScript Object Notation (JSON) object signed with the private key of the entity that created that block within the chain. A block could also be represented in binary, Binary JSON (BSON), Extensible Markup Language (XML), flat text, or any other format that could be used to represent the required fields.

In the case of a JSON object, it includes attributes representing the following:
    the acct Uniform Resource Indicator (URI) of the entity that created the block,
    an array of group membership update operations,
    a timestamp indicating the date and time of the block's creation, and
    a hash of the preceding block in the membership chain (if any).

A GMBC is composed of JSON encoded blocks, each signed with the private key of the entity that introduced that block to the chain. Signing is performed in conformance with the JWS [RFC7515] specification and the block is communicated between entities in the form of a JWS compact serialization.

The basic payload of a GMBC block may defined as follows, using JSON content rules notation [I-D.newton-json-content-rules].

```
operation "Operation" {
    "entity": uri,                    ; acct URI of entity added/removed
    "optype": < "odd" "remove" >      ; tag indicating type of operation
}
gmbc-block {
    "creator": uri,                   ; acct URI of creator of the block
    "created": date-time,             ; date and time of block creation
    "antecedent": string,             ; SHA-256 hash of preceding block
    "operations" [ *: operation ]     ; membership update operations
}
```

A GMBC genesis black is specified as a basic block with three additional payload fields, as defined below.

```
gmbc-genesis-block {
    "resource": uri,          ; URI of the group comms. resource
    "curator": ?uri,          ; (optional) acct URI of curator
    "nonce": integer,         ; a random one-time numeric value
    gmbc-block                ; standard block attributes
}
root gmbc-genesis-block
```

A GMBC non-genesis block is specified as a basic block with one additional payload field, as defined below.

```
gmbc-appended-block {
    "antecedent": string,     ; SHA-256 hash of preceding block
    gmbc-block                ; standard block attributes
}
root gmbc-appended-block
```

A group membership update operation is a JSON object with two fields:
    a tag indicating the operation type ("add" or "remove"), and
    the acct URI of the entity being either added to or removed from the group.

In addition to the above attributes, the first block of the chain, or genesis block, also includes the following attributes:
    a URI that uniquely identifies the group communications resource,
    the acct URI of the group's curator (optional), and
    a nonce.

The genesis block also includes at least one "add" operation, though it need not necessarily represent the addition of the entity that created it (i.e., entities may create new groups within which they are not themselves members).

The curator may be identified in the genesis block of a GMBC as a permanent member of a group and that performs a function of accepting and distributing GMBC updates and Group Keys (described below) among group members. An entity is a user or automated agent that is uniquely identifiable by an acct URI and for which there exists a key discovery through which public keys may be obtained for that URI. An entity uniquely identified by an acct URI may be authenticated by demonstrating possession of the private counterpart of one or more public keys as may be discovered using that acct URI and the mechanisms described herein.

To protect against unauthorized tampering the GMBC is validated by verifying the signatures of each block, verifying that each non-genesis block contains a valid hash of the preceding block, and verifying that each block was created and signed by an entity that is among the group's membership as determined by the segment of chain preceding that block. Block signature verification may be made possible through key discovery mechanisms defined, for example, in https://tools.ietf.org/html/draft-miller-saag-key-discovery-00, and the knowledge of each member's acct URI.

Thus, authorization is the classification of any given entity as either a "member" or "non-member" with respect to a group. A member of the group is by definition authorized to receive keying material used to encrypt group communications, and likewise a non-member is not. A member is also entitled to alter the membership of the group. The means by which group membership classification established, updated, and validated, is through operations on a GMBC.

Figure 6:
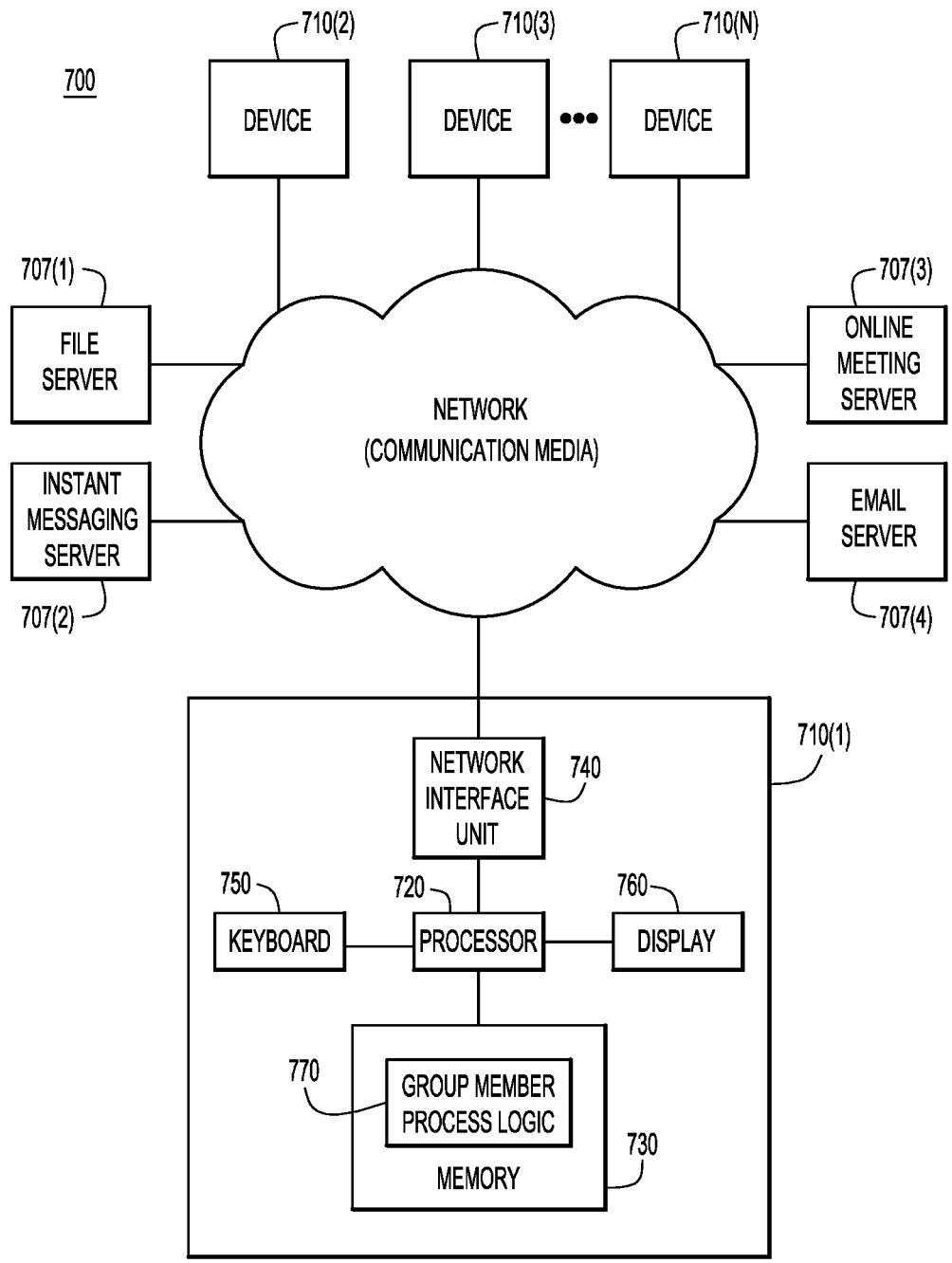
FIG. 6 is a block diagram of a device configured to perform the techniques presented herein, according to an example embodiment.

Reference is now made to FIGS. 1A-1H for a description of an example. In this example, there are 5 users: Alice, Bob, Chuck, Diane and Evan, shown at reference numerals 10(1)-10(5), respectively. Initially, Alice decides to invite Bob to a new group, as shown in FIG. 1A. It should be understood that each user is associated with a device or application that is configured to perform the operations described herein. An example of a user device is shown in FIG. 6, described hereinafter.

Figure 1C:
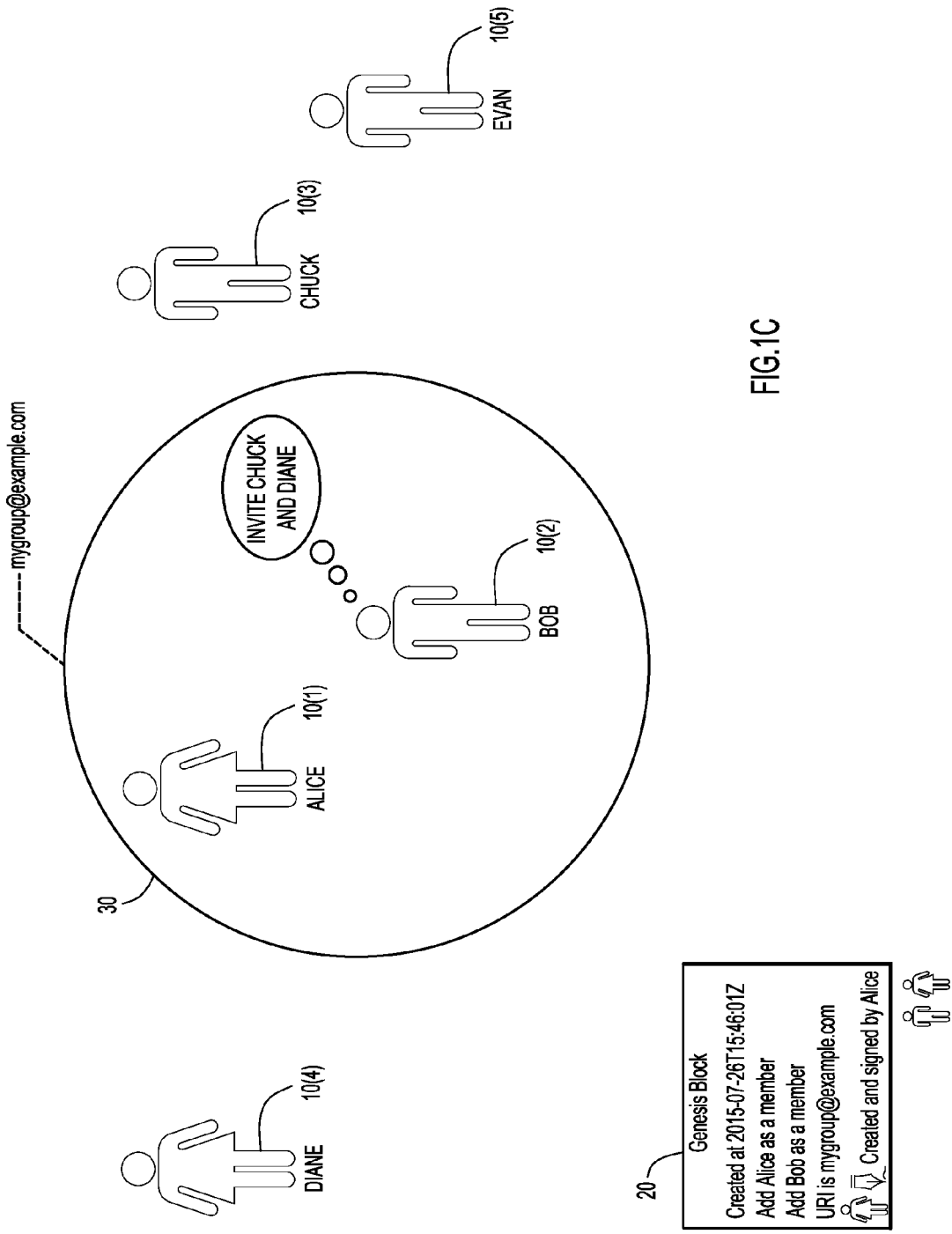
Figure 1D:
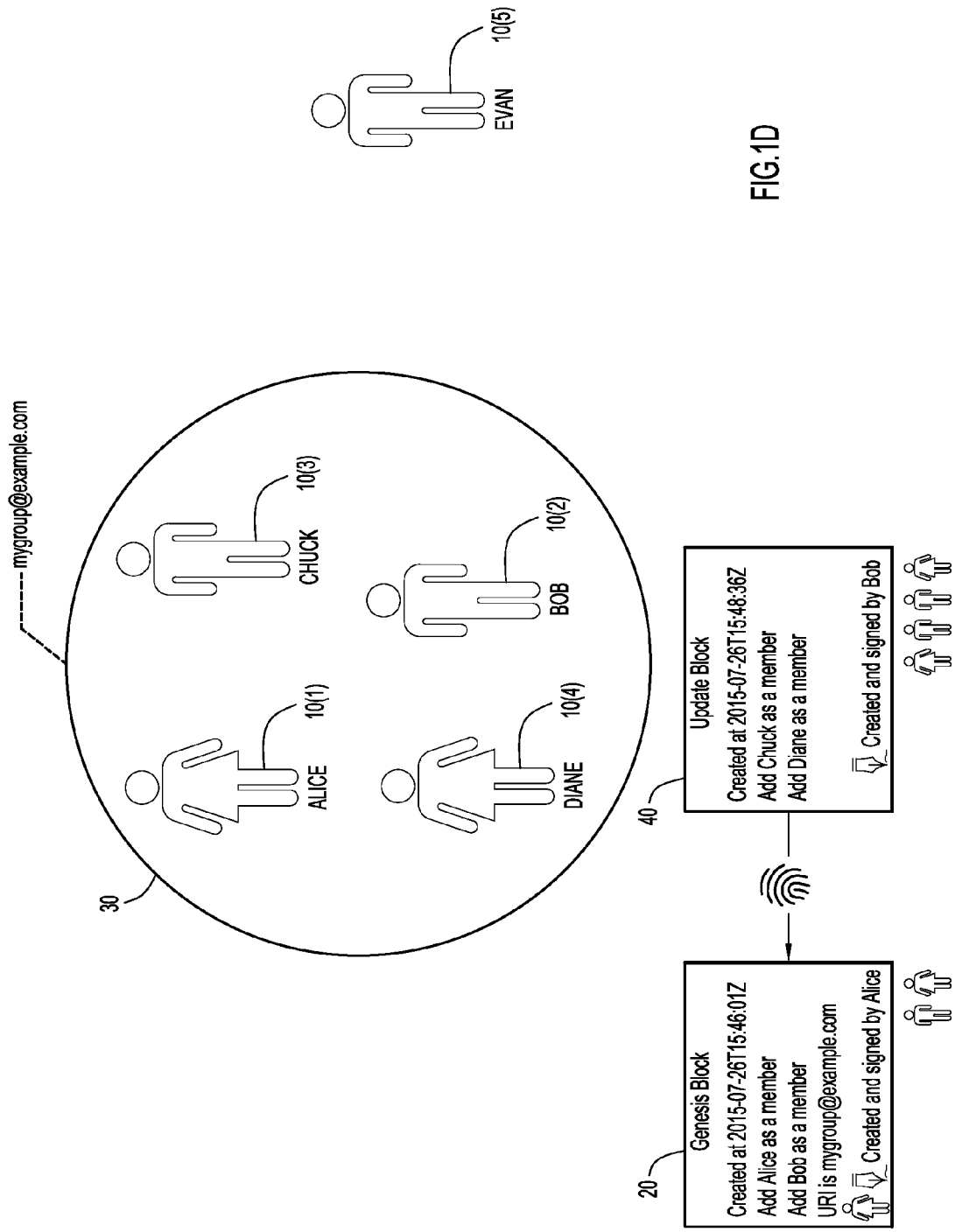

A first block or genesis block 20, is created, as shown in FIG. 1B. The new group is shown at 30. The genesis block indicates Alice added as a member and Bob added as a member. The URI is, in this example, mygroup@example.com. The genesis block 20 is created and signed by Alice. Next, as shown in FIG. 1C, Bob decides to invite Chuck and Diane to the group. When this happens, then as shown in FIG. 1D, an update block 40 is created that includes elements indicating Chuck is added as a member and Diane is added as a member.

Figure 1E:
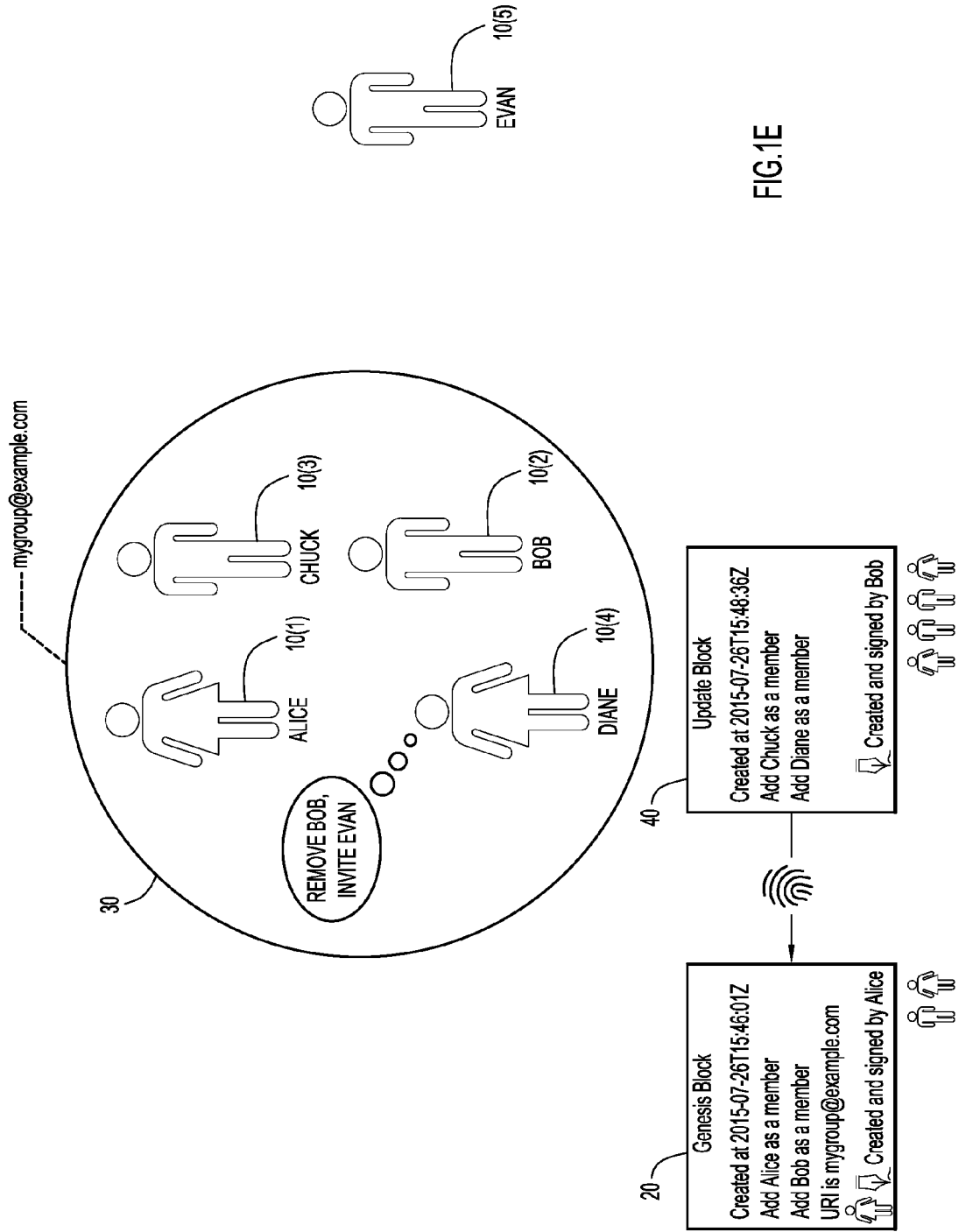

Now, in FIG. 1E, Diane decides to remove Bob and invite Evan. When this happens, an update block 50 is created, including an element indicating Bob is removed as a member and Evan is added as a member, as shown in FIG. 1F.

Figure 1G:
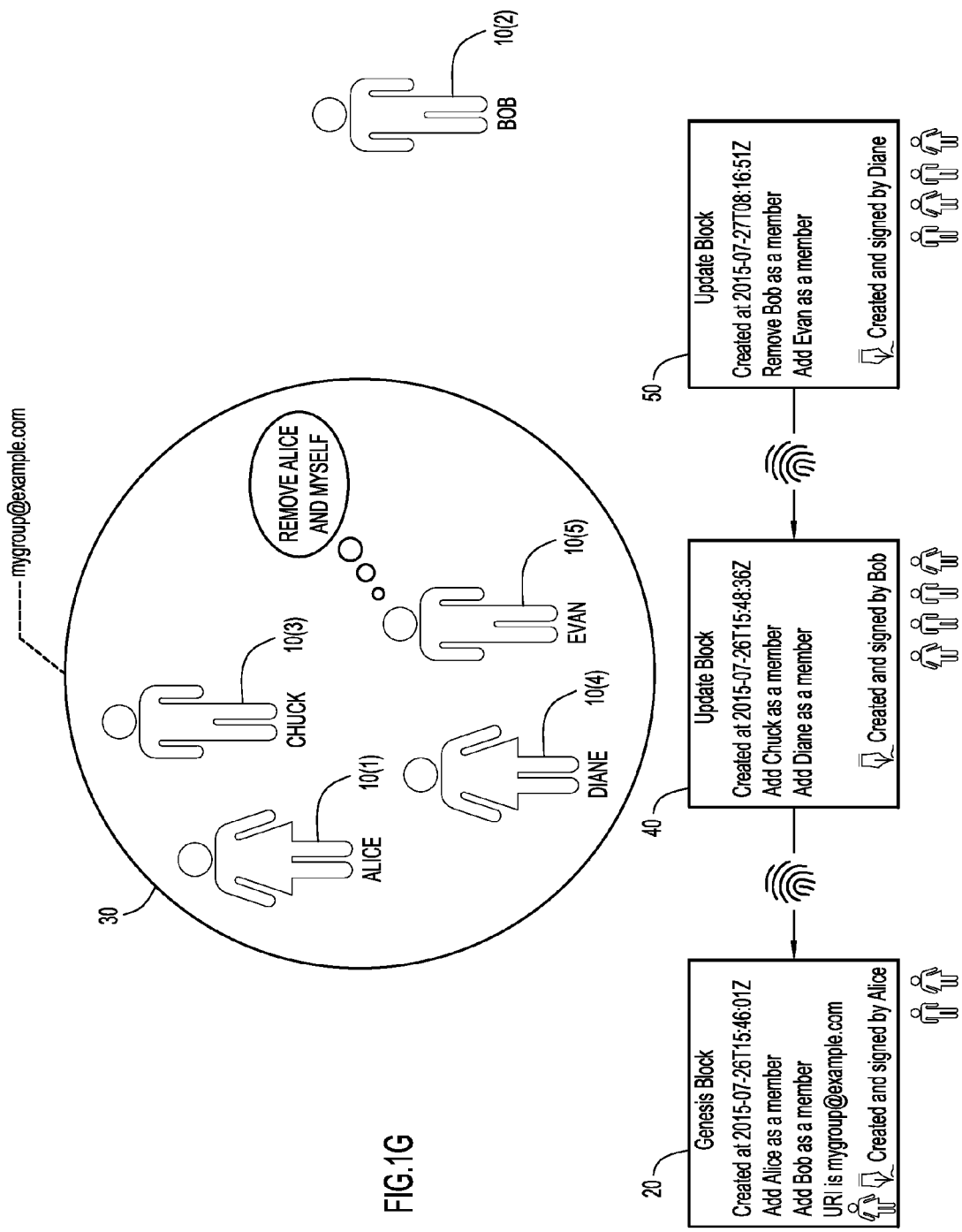
Figure 1H:
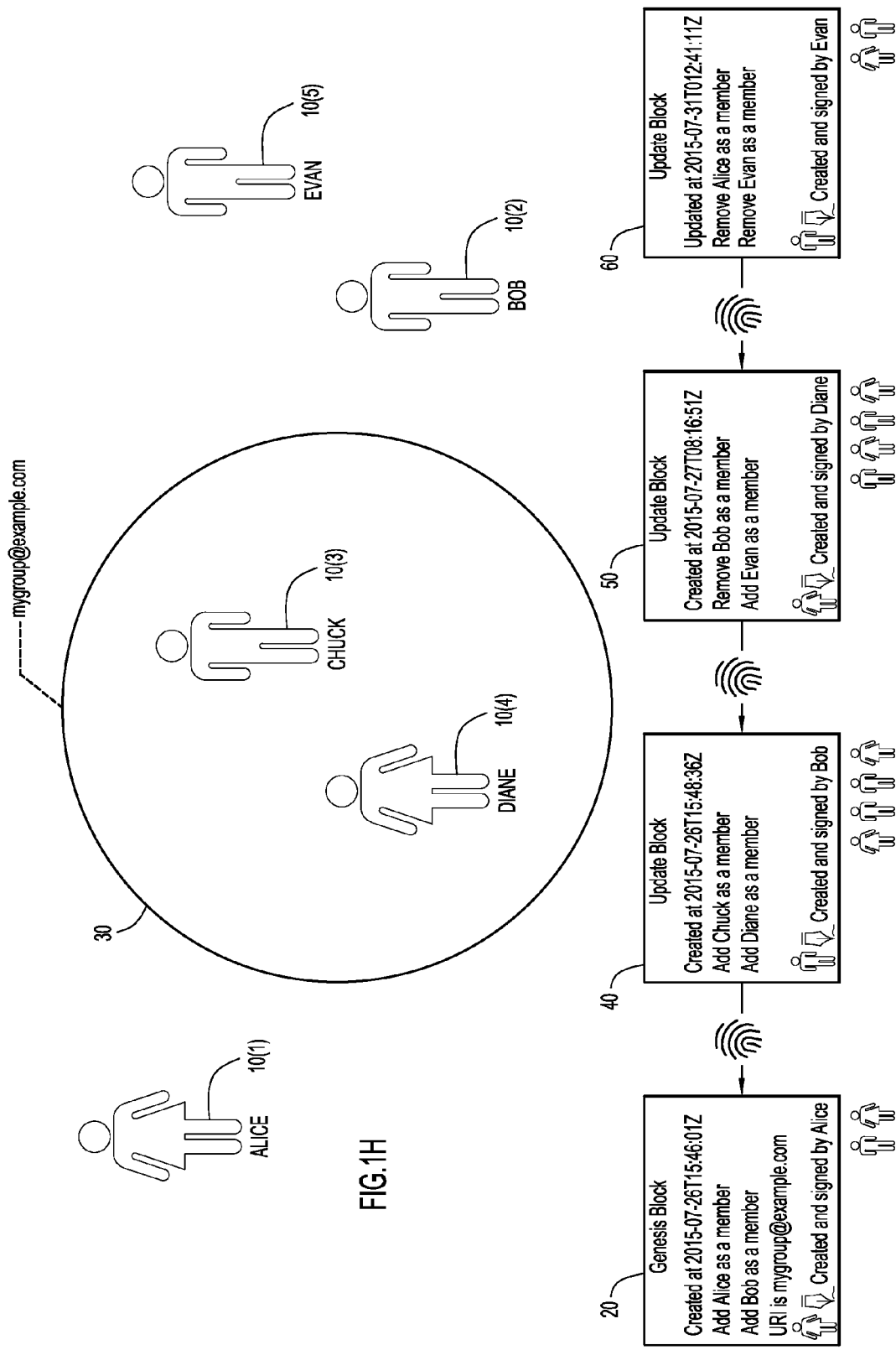

In FIG. 1G, Evan decides to remove him and Alice. As shown in FIG. 1H, Evan and Alice are removed, and an update block 60 is created with elements indicating Alice is removed as a member and Evan is removed as a member.

Figure 2A:
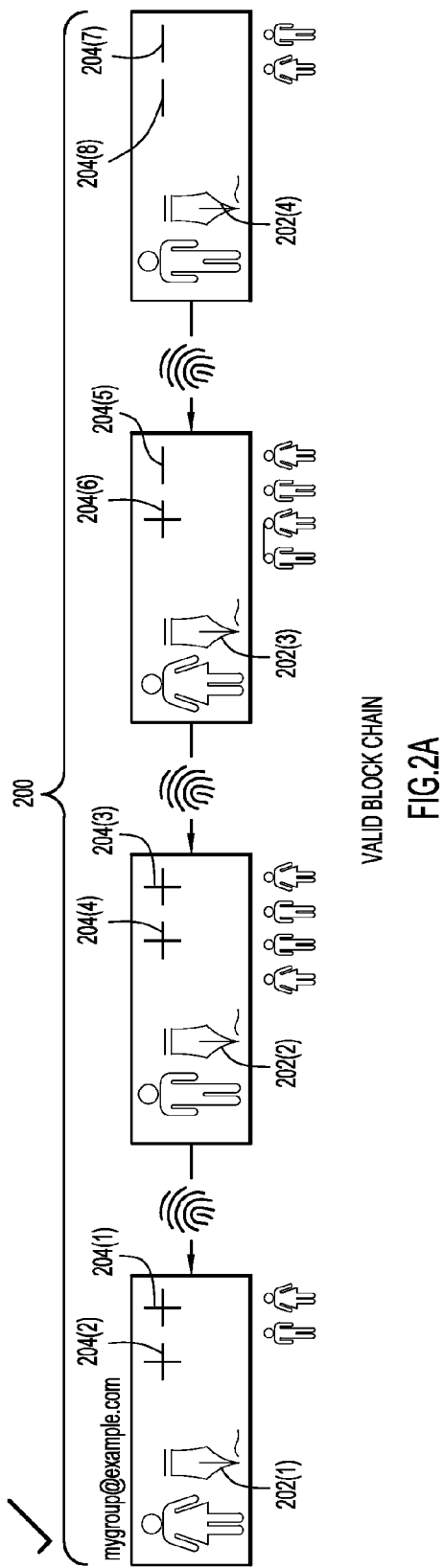
FIG. 2A illustrates an example of a valid group membership block chain, according to an example embodiment.

FIG. 2A illustrates an example of a valid block chain 200. In FIGS. 2A-2F, reference numeral 202(1) refers to a signature operation performed by Alice, 202(2) refers to a signature operation performed by Bob, 202(3) refers to a signature operation performed by Diane and 202(4) refers to a signature operation performed by Evan. In addition, 204(1) refers to an add operation for Alice, 204(2) refers to an add operation for Bob, 204(3) refers to an add operation for Chuck, 204(4) refers to an add operation for Diane, 204(5) refers to an remove operation for Bob, 204(6) refers to an add operation for Evan, 204(7) refers to a remove operation for Alice and 204(8) refers to a remove operation for Evan.

Figure 2B:
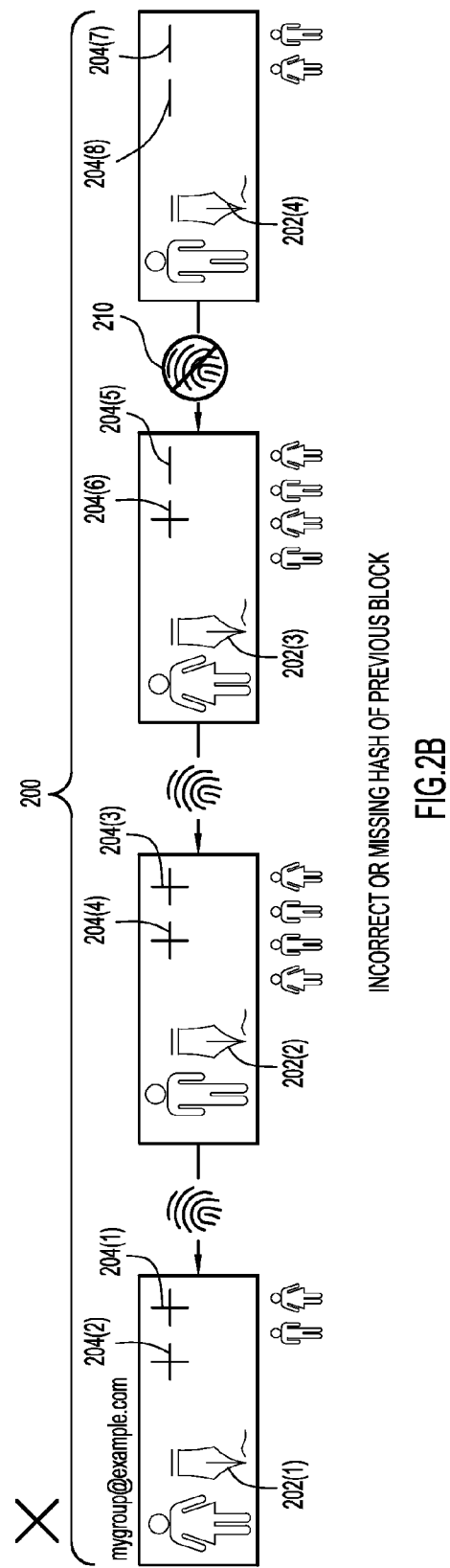
Figure 2C:
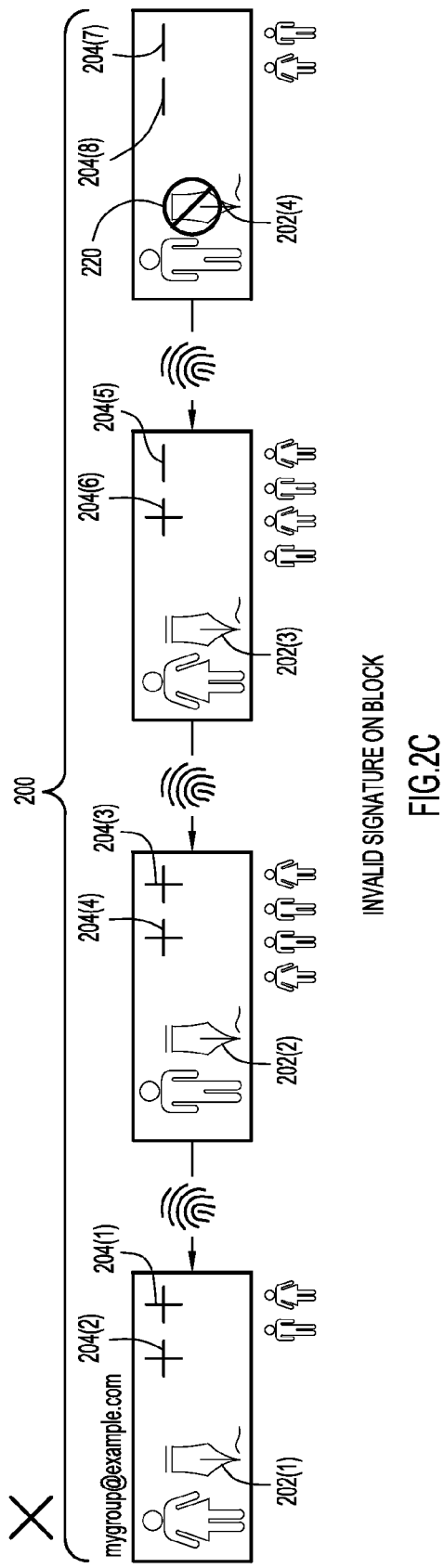
Figure 2D:
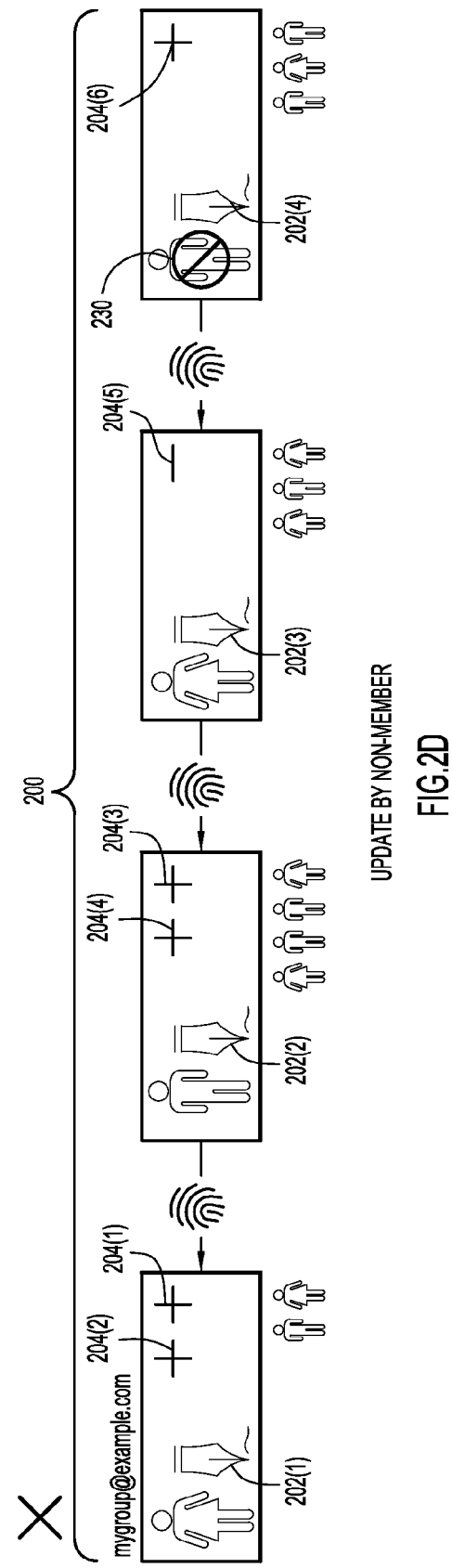

FIGS. 2B-2F illustrate examples of invalid block chains, for a variety of different reasons. At 210, FIG. 2B illustrates an incorrect or missing hash of a previous block. At 220, FIG. 2C illustrates an invalid signature on a block. At 230, FIG. 2D illustrates an attempt by a non-member to make an update. At 240, FIG. 2E illustrates another example of an attempt by a non-member to make an update. At 250, FIG. 2F illustrates an example in which the updating person and the signature do not match.

In a decentralized group, the fact that there is no single entity providing an authoritative and definitively current version of the GMBC means that members can make concurrent updates to their own copies of the GMBC and thereby create conflicts in their collective understanding of group membership history. Such conflicts are manifest as a divergence where each GMBC has a different block, let us call them B and B', appended to some block A that they have in common. A member encountering this condition selects either one of the two GMBCs in its entirety and discards the other. This selection may be performed by observing the hash values of blocks B and B' and selecting the GMBC to which the block with the numerically smallest hash belongs. If, as a result of this selection, an entity finds that a block that it had itself previously introduced to the discarded GMBC is not represented in the retained GMBC, then that entity is responsible for appending a new block to the retained GMBC to represent that membership update (and, of course, share that update to other members).

Figure 3A:
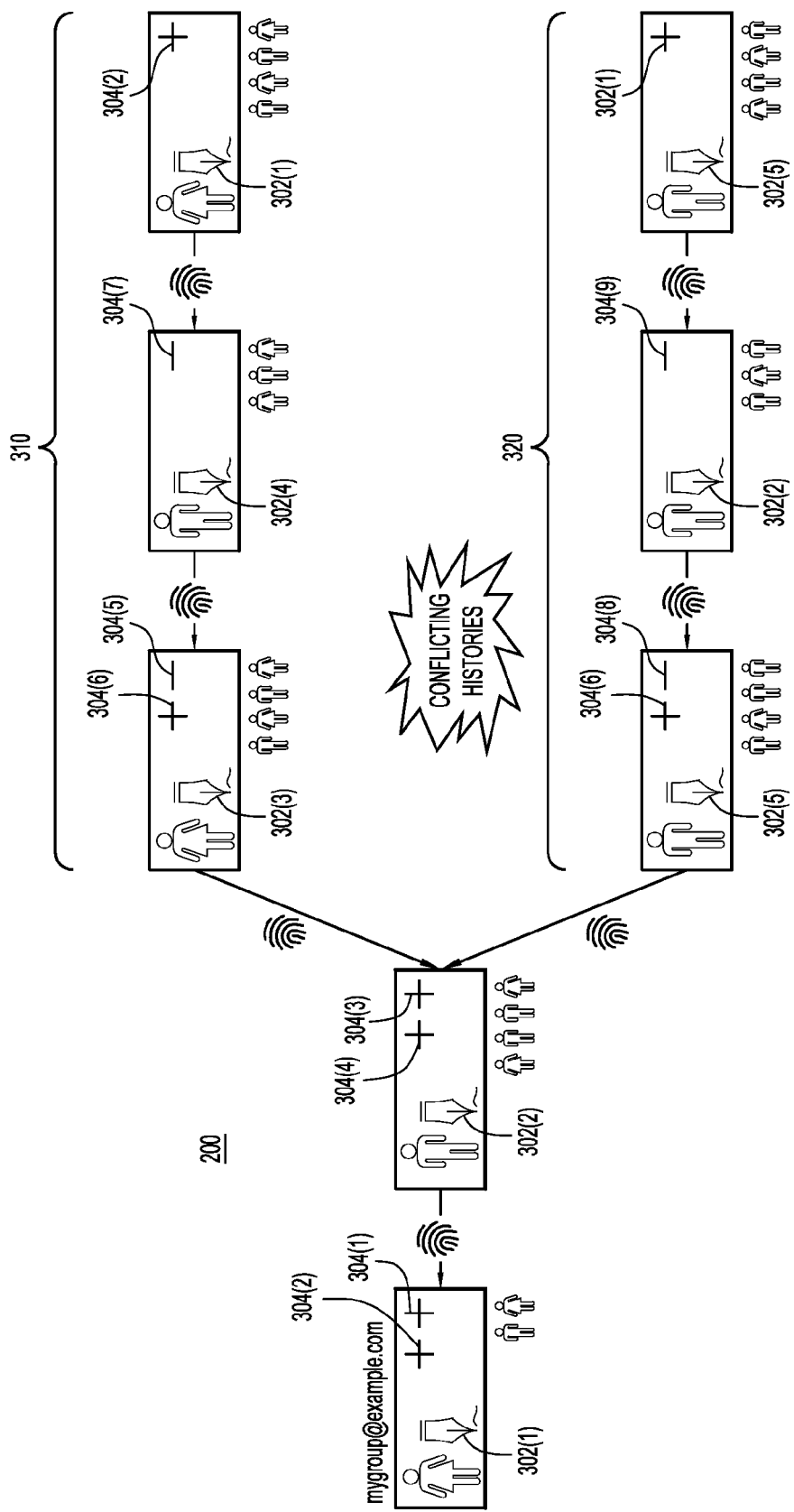
Figure 3C:
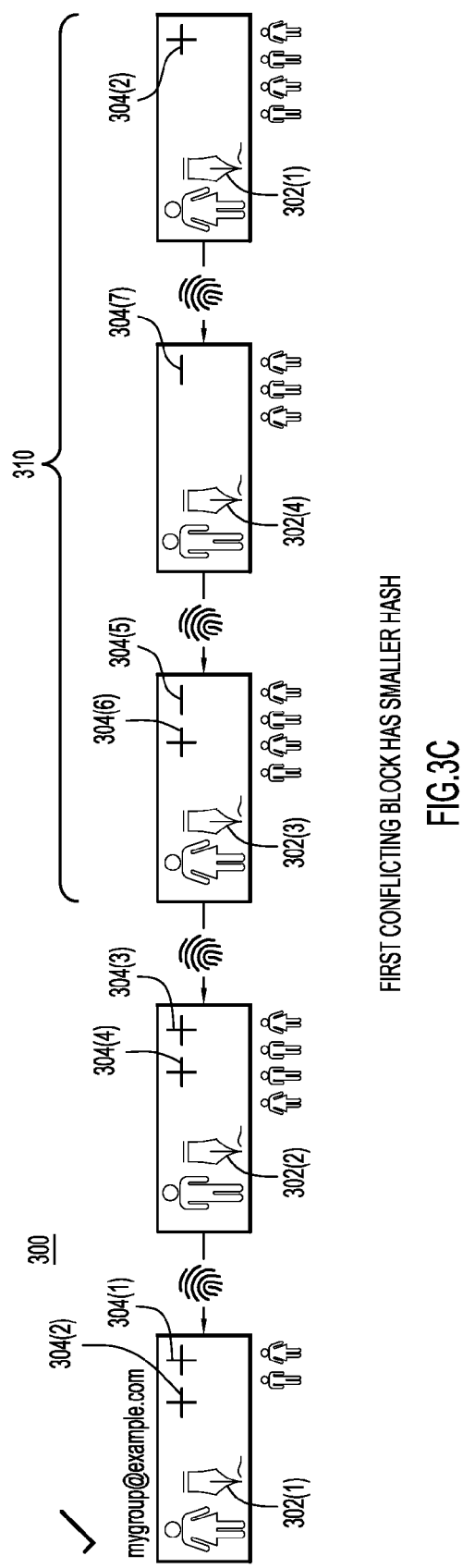

FIGS. 3A-3C illustrate an example when there are conflicting histories in a GMBC. In FIGS. 3A-3C, reference numeral 302(1) refers to a signature operation performed by Alice, 302(2) refers to a signature operation performed by Bob, 302(3) refers to a signature operation performed by Diane, 302(4) refers to a signature operation performed by Evan, and 302(5) refers to a signature operation performed by Chuck. In addition, reference numeral 304(1) refers to an add operation for Alice, 304(2) refers to an add operation for Bob, 304(3) refers to an add operation for Chuck, 304(4) refers to an add operation for Diane, 304(5) refers to a remove operation for Bob, 304(6) refers to an add operation for Evan, 304(7) refers to a remove operation for Evan, 304(8) refers to a remove operation for Alice, and 304(9) refers to a remove operation for Chuck.

As shown in FIG. 3A, the GMBC 300 includes two paths 310 and 320 (shown as upper and lower paths, respectively). In this example, in the upper path, the first conflicting block has a hash value that is smaller than the hash value for the first conflicting block in the lower path. This is shown in FIG. 3B. As a result, the upper path is selected to resolve the conflict, as shown in FIG. 3C.

A Group Key (GK) is a standard JavaScript Object Signing and Encryption (JOSE) JSON representation that wraps a content key with the public keys of each other GMBC group member. GK objects can be shared openly without compromising confidentiality. A group key is a signed and encrypted object containing symmetric key material and associated metadata secured by the public key(s) of group members.

A GK is composed of JSON encoded blocks, each signed with the private key of the entity that created it (or the curator when servicing GK requests in centralized groups). Signing is performed in conformance with the JWS specification and the block is communicated between entities in the form of a JWS compact serialization.

The creator of a GK signs the GK such that the authenticity of the associated metadata may be verified by its recipients. The payload of the GK is a JSON object includes attributes representing the following:
 a URI that uniquely identifies the GK,
 the acct URI of the creator of the GK,
 a hash of the GMBC tail block at the time this key was created,
 an encrypted JSON Web Key (JWK) [RFC7517] that contains the symmetric key material, and
 a timestamp indicating the date and time the GK was created.

Thus, the payload of a GK may be defined as follows:

```
group-key {
    "uri": uri,              ; URI to identify the GK itself
    "creator": uri,          ; acct URI of creator of the GK
    "created": date-time,    ; the date and time of GK creation
    "block": string,         ; SHA-256 hash of GMBC block
    "key": wrapped-key       ; encrypted symmetric key material
}
root group-key
```

The JWK attribute value is encrypted in a JWE [RFC7516] JSON serialization with one or more recipients. The payload of that JWE is a JWK [RFC7517] representing a symmetric key. In decentralized groups the resulting JWE JSON serialization includes each other member of the group as determined by the current and validated GMBC. In centralized groups the resulting JWE JSON serialization may include as a recipient just the curator (e.g. when an entity shares a new GK) or just one member (e.g. when the curator shares a GK with a member that has requested it). The full JSON payload of the GK is signed as a JWS [RFC7515] using the creator's private entity key.

GKs may be created by members and non-members alike. A non-member may generate a GK as described above and use it to encrypt its own communications to the group. This can be a useful property as it provides for a confidential "write only" capability to the group communications resource.

A group may have any number of GKs associated with it. Where practical, it is recommended that each member of a group use its own GK for purposes of encryption and share this GK with the remainder of the group for purposes of decryption. A member must not re-use the keying material of a GK created by another entity to encrypt its own communications unless it has verified that GK is signed by a current member of the group as defined by the GMBC.

Upon receiving and validating an update to the GMBC, each entity discards their encryption GK and produce a new encryption GK for which the recipients reflect the updated GMBC membership. This is necessary to ensure that new members are able to decrypt subsequent communications but not prior communications. Perhaps more importantly, this also ensures that former members are not able to decrypt subsequent group communications. In centralized groups the curator may implement a policy where it permits new group members to request previously created GKs.

All entities that share encrypted content over the group communications resource may rotate their GKs regularly so as to mitigate against vulnerabilities that are exacerbated by the extended use of individual keys.

A decentralized group is characterized by the absence of a curator attribute in the GMBC genesis block and therefore the absence of a permanent member within the group through which GMBC and GK objects may be exchanged. In a decentralized group these objects may instead be exchanged either in-band through the group communications resource itself, or through in-band references to external repositories from whence GMBC and GK objects may be retrieved.

Both the GMBC and GK objects are designed to be hardened against tampering and protect sensitive data such that they may be reasonably exchanged through either public or private transports and stores. Note, however, that regardless of the employed mechanisms of exchange a protocol utilizing a decentralized group pattern needs to provide a means by which any GMBC update or new GK produced by a member may be delivered to each other group member in a timely fashion.

A centralized group is characterized by the presence of a curator attribute in the GMBC genesis block. The curator attribute identifies an entity by its acct URI and declares that entity as a permanent member of the group which will serve as a facilitator for the exchange of GMBC and GK objects among all group members. In particular, a curator will respond to the following types of requests from other entities.

GMBC Post

When adding or removing members from a group, a member will submit a new GMBC block to the curator representing that change. The curator will verify that the block is signed by a member of the group and that the hash attribute of the block represents the hash of the current tail end of the chain. If both checks succeed then the curator will make the new block a permanent part of the GMBC and indicate to the requesting entity that the update was successful.

GMBC Get

Entities may request all or part of the current GMBC from the curator by providing to the GMBC a hash of the last GMBC block of which they are aware (or 0x0 if they are requesting the entire chain).

GMBC Notify

In some deployments it may be desirable for a curator to immediately multicast GMBC updates to all current members of the group. This may be based on either an explicit or automatic/implicit subscription model.

GK Post

Entities may inform the curator of new GKs which they have generated for the purpose of encrypting data they emit to the group communications resource. The curator will store received GKs such that it may subsequently service requests for that GK from other members that wish to decrypt these communications.

GK Get

Members may request from the curator GKs which have been generated by other entities. In doing so, an entity indicates the URI of the requested GK and the curator verifies that the requesting entity was a member of the group at the time the GK was created by processing the GMBC from the genesis block up to and including the block whose hash is indicated in the metadata of the requested GK. A successful confirmation of the requesting entity as a member of the group at that point in time will result in the curator generating a new GK which is in every way identical to the requested GK except that the key material is re-encrypted using the public key of the requesting entity and the GK itself is signed using the curator's own public entity key.

Example: Decentralized Group File Sharing

An application utilizes a third party file sharing service to store confidential information and employs these techniques as part of a scheme to secure that confidentiality among the members of self-defined group.

1. User A generates a symmetric key to be used for file encryption.

2. User A encrypts a file using the symmetric key and posts it to the file sharing service.

3. User A generates a new GMBC by creating a genesis block. In that block user A includes a reference to the URL of the encrypted file on the file sharing service. User A also adds to the genesis block three group membership "add" operations: one for itself, one for user B, and one for user C.

4. User A creates a GK that includes a hash of the GMBC genesis block, and encrypts the key material portion of the GK using a multi-recipient JWE JSON serialization that indicates users B and C as recipients.

5. User A posts the GMBC and GK as text files to the same file sharing service, and sends the URL of the encrypted content file, the URL of the GMBC, and the URL of the GK to users B and C.

6. User B recognizes user A's acct URI as the identity of a trusted correspondent, retrieves the GMBC and GK from the file service, and verifies the signatures on the GMBC genesis block and GK by discovering and retrieving user A's public entity key.

7. User B uses its own private entity key to decrypt the key material contained within the GK, downloads the file indicated by the resource URL in the GMBC genesis block, and decrypts the contents of that file.

8. User C repeats the procedure outlined for user B in steps 6 and 7.

Example: Centralized Group Instant Messaging

An Application that Utilizes Some Instant Messaging Service to Exchange Confidential messages among a group of users and employs the embodiments presented herein as part of a scheme to secure that confidentiality among the members as a centralized group.

1. User A establishes a messaging thread on the messaging service that includes users B and C. It can be associated with some unique URI for purposes of identification.

2. User A generates a new GMBC by creating a genesis block. In that block user A includes a reference to the URI of the messaging thread created in step 2, and three group membership "add" operations: one for itself, one for user B, and one for user C. User A also identifies itself as the curator of the group by provisioning the genesis block with its own acct URI in the curator field.

3. User A creates a GK that includes a hash of the GMBC genesis block.

4. User A encrypts a message using the keying material of the GK and sends it over the instant messaging service. As metadata within that message it also includes the URI of the GK it used to encrypt the message and the current GMBC.

5. User B recognizes user A's acct URI as the identity of a trusted correspondent and validates the GMBC as originating from user A by discovering and retrieving user A's public entity key.

6. User B observes that the GMBC indicates user A as the curator for this group and sends a request (perhaps as an in-band extension to the instant messaging protocol) to user A for the GK used to encrypt the message sent in step 3.

7. User A receives the GK request from user B, validates that user B was a member of the GMBC at the time the requested GK was created, and returns a copy of the GK created in step 3 with the keying material portion encrypted using the public entity key of user B.

8. User C repeats the procedure for user B in steps 4-6.

Figure 4A:
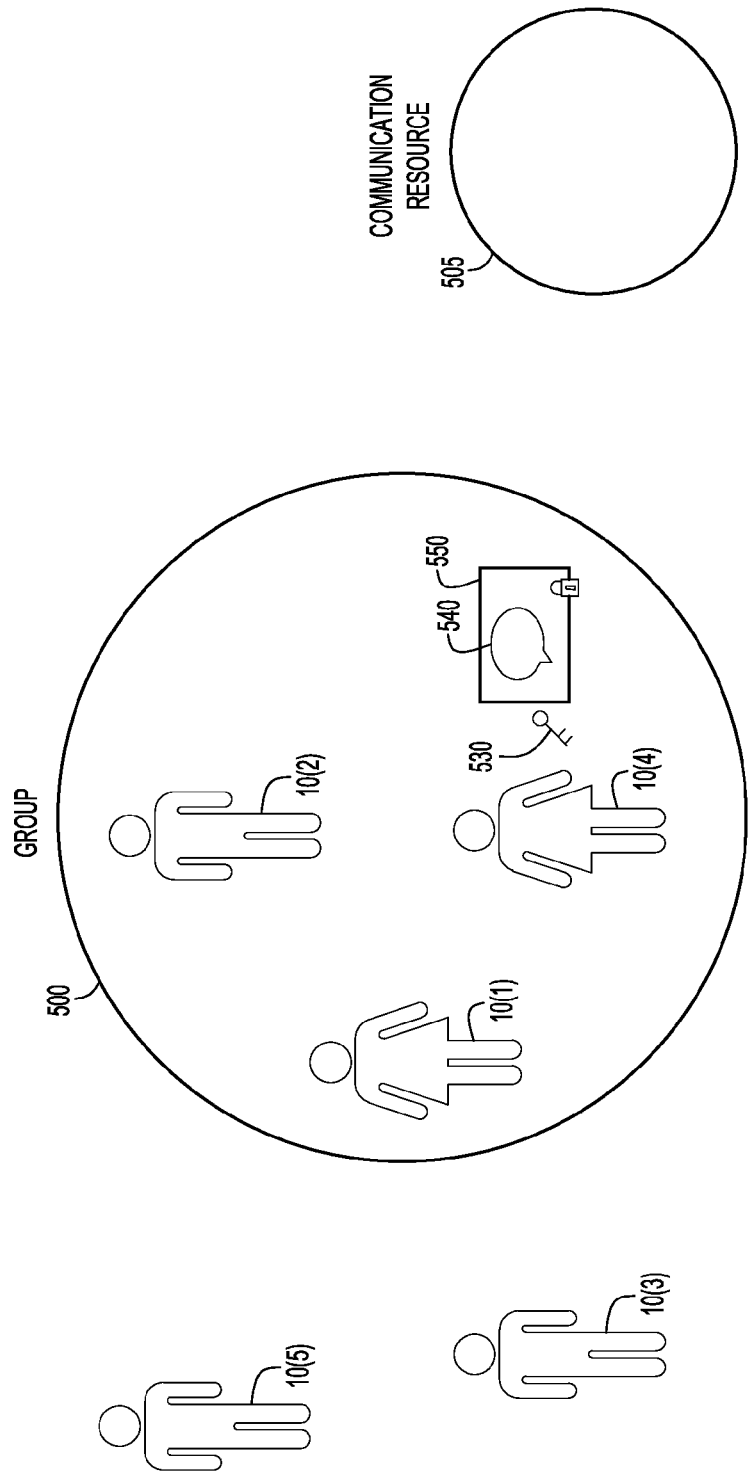
Figure 4A:
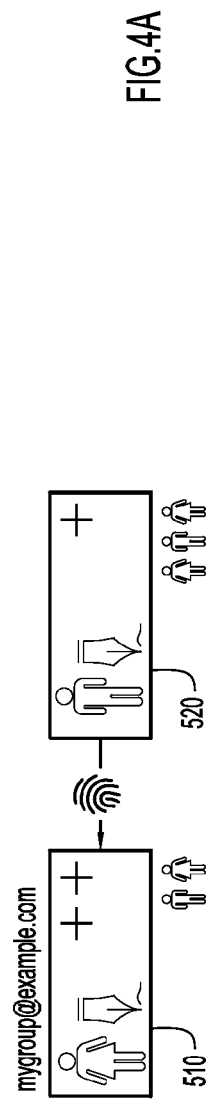
Figure 4B:
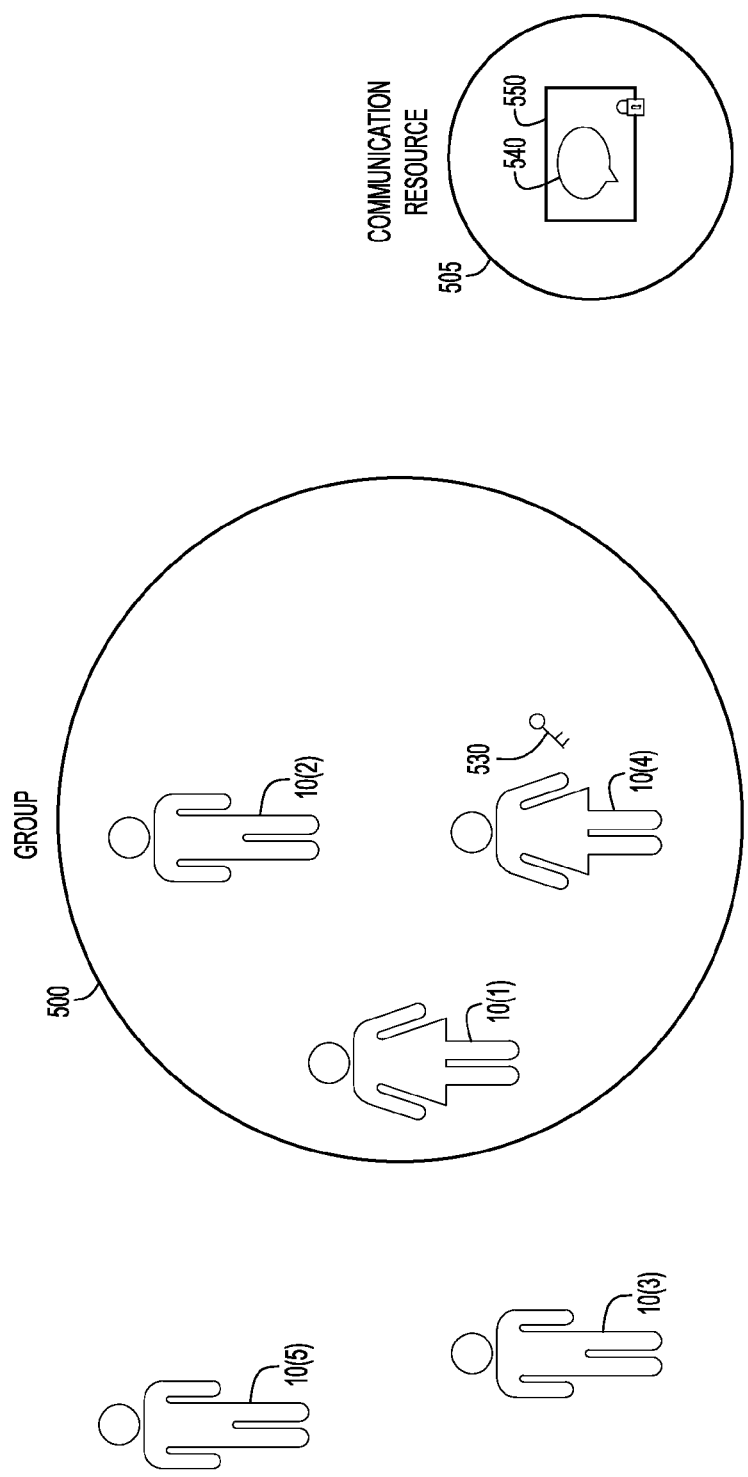
Figure 4B:
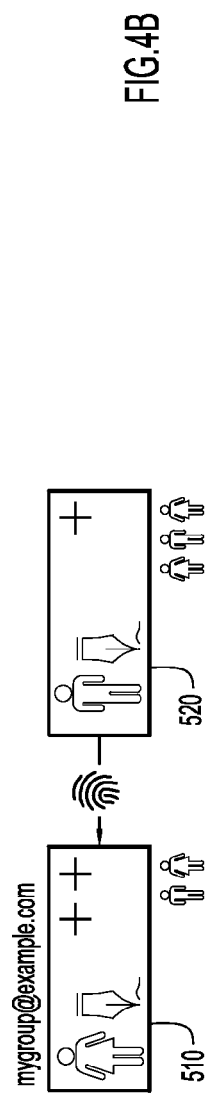
Figure 4C:
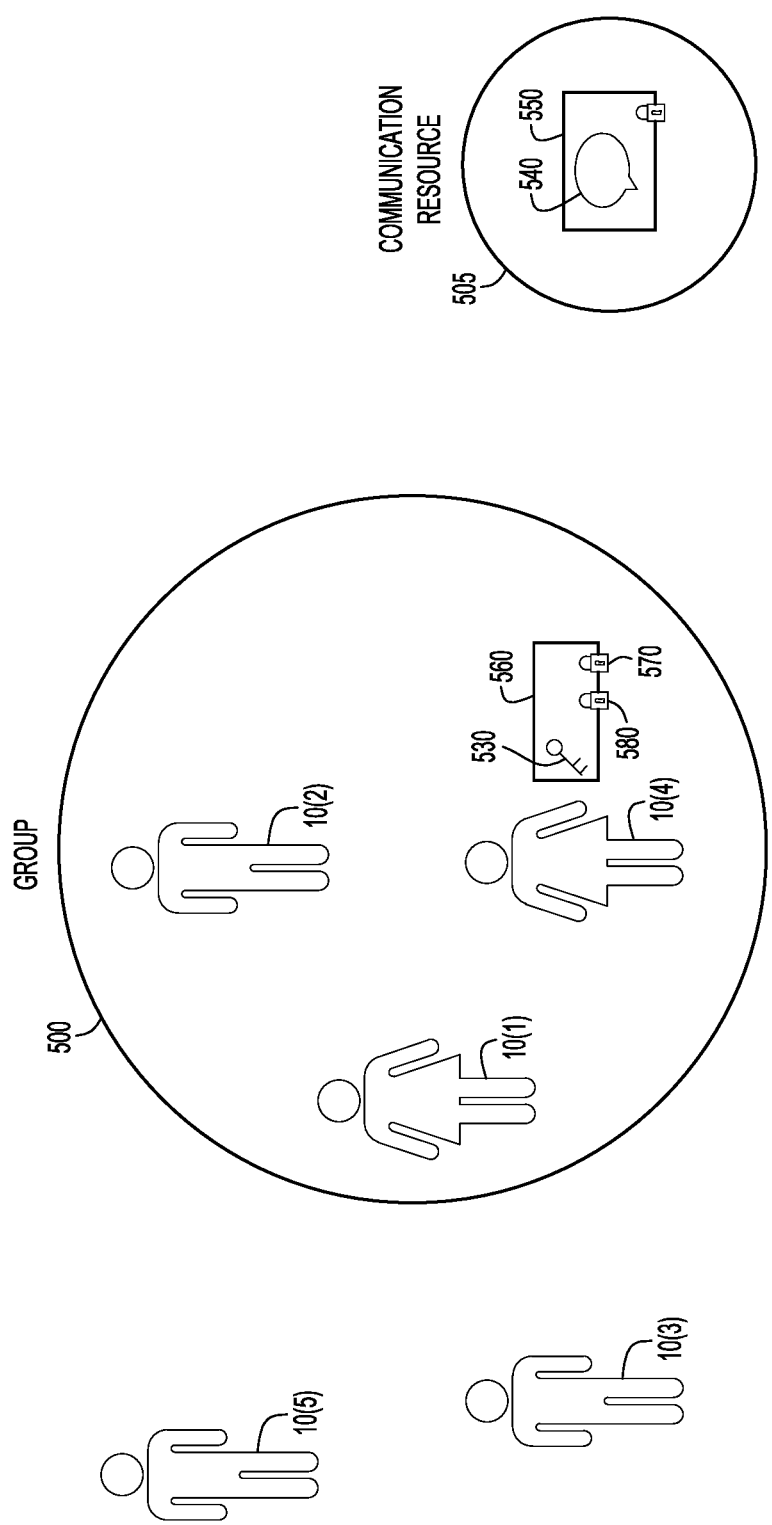
Figure 4C:
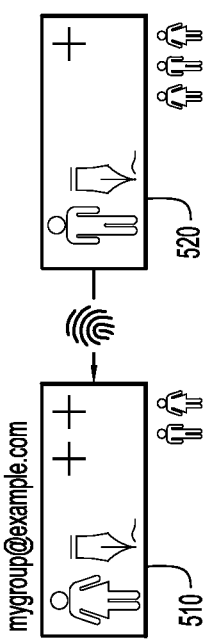
Figure 4D:
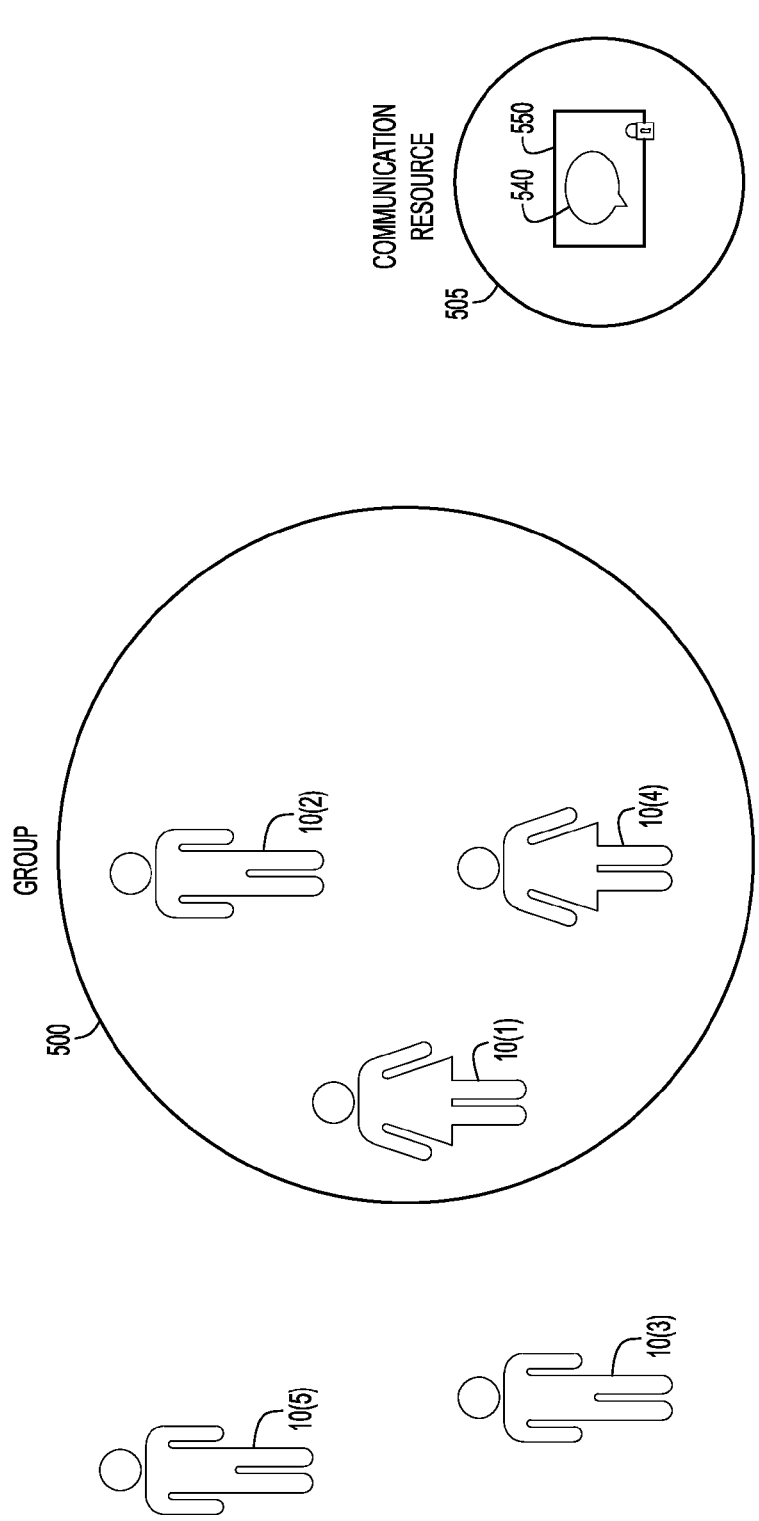
Figure 4D:
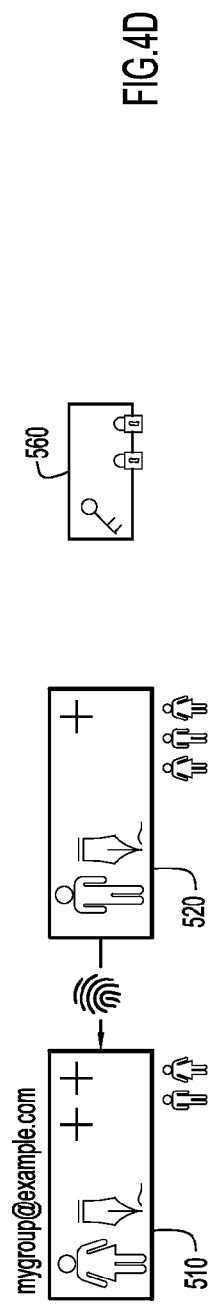
Figure 4E:
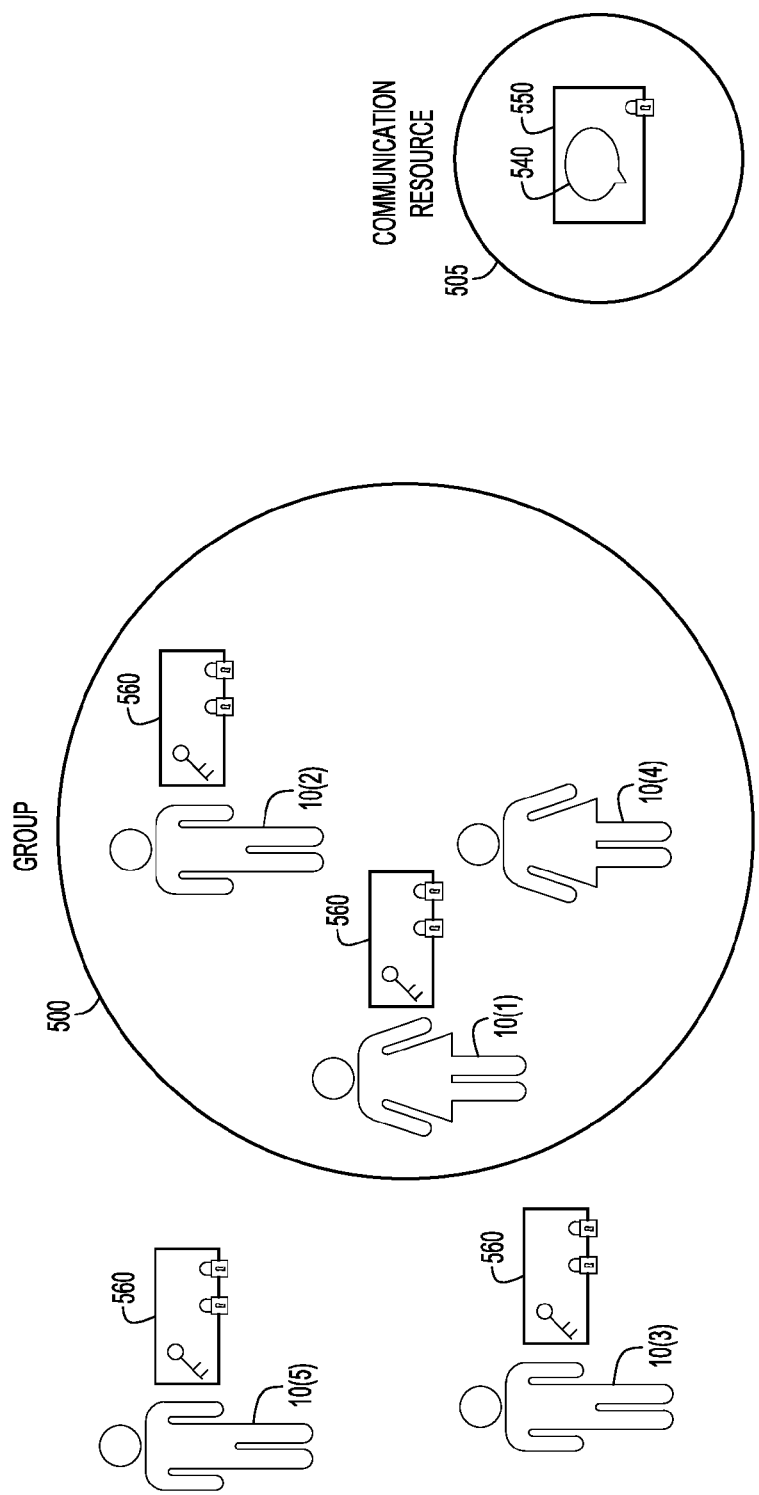
Figure 4E:
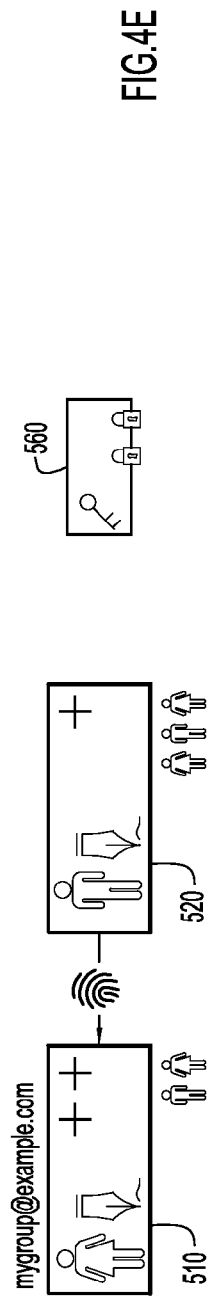
Figure 4F:
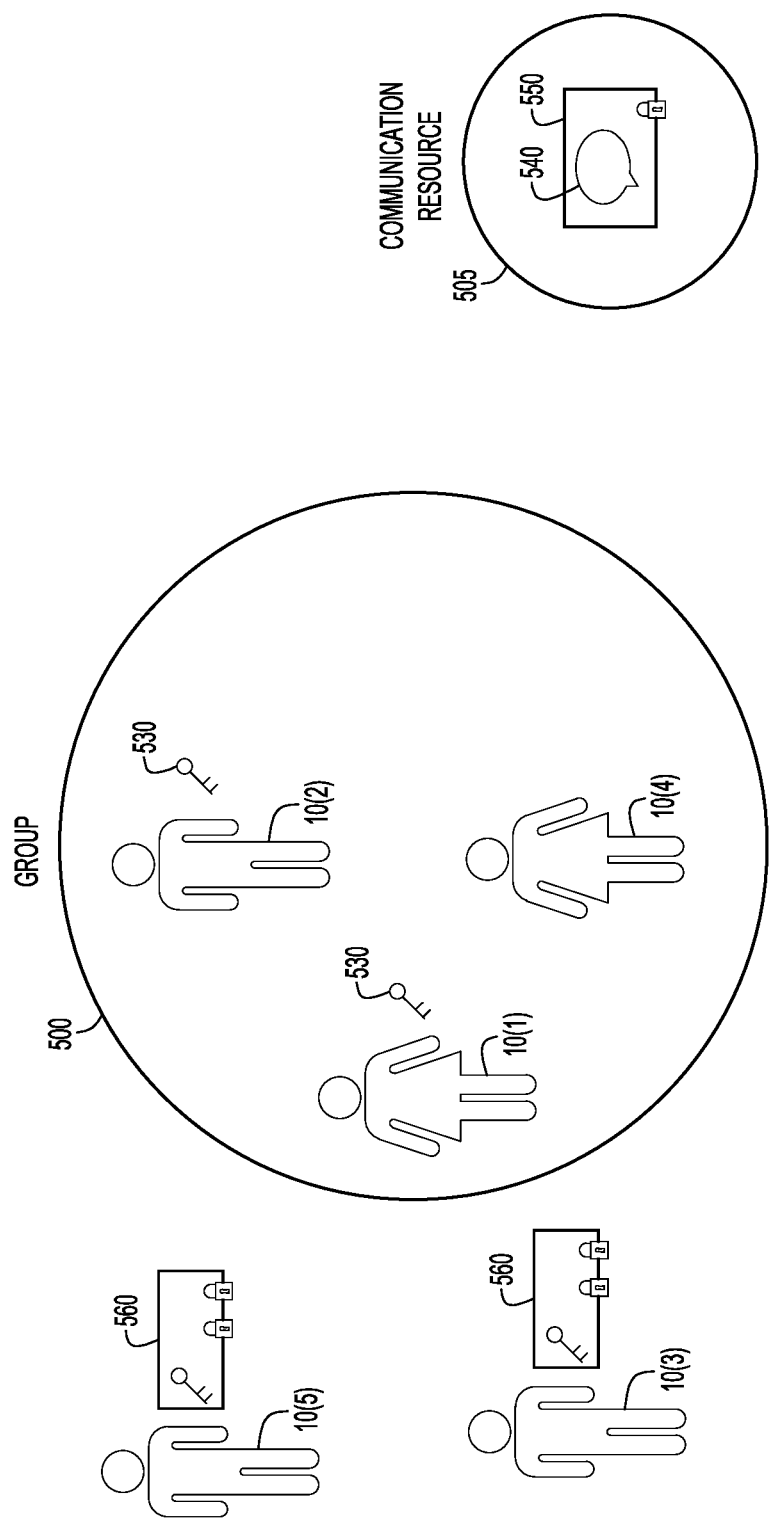
Figure 4F:
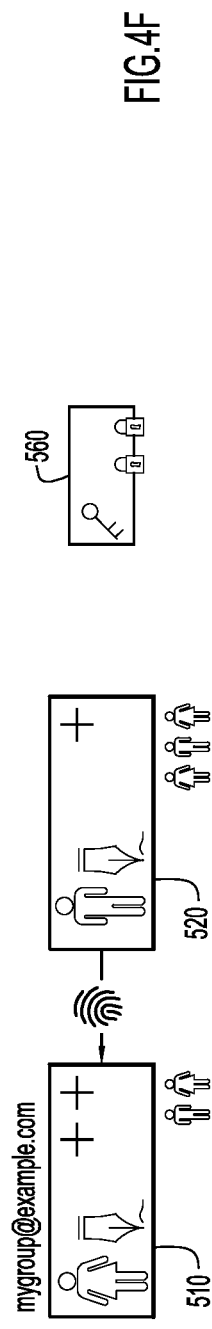

Reference is now made to FIGS. 4A-4I for an example of the use of GK objects. In this example, there is a group 500 consisting of Alice (purple), Diane (green) and Bob (red). The communication resource 505 may include wired connections, wireless connections, wireless network, wired networks, etc. The various users can communicate with each other via a communication resource 505. Alice initiated the group with the genesis data block 510 by adding Bob. Bob then added Diane with the update data block 520 as shown in FIG. 4A. In FIG. 4A, Diane has a private content key 530 and content 540 to be sent via a communication resource. Diane encrypts that content with the private content key and provides the encrypted content 550 to the communication resource 505, as shown in FIG. 4B. In FIG. 4C, Diane generates a GK 560 by wrapping her private content key 530 with the public key 570 and 580 of each of the other two group members, Alice and Bob. Diane then makes this GK 560 available to the other group members without compromising confidentiality, as shown in FIG. 4D. Thus, there is no concern if the GK 560 finds its way outside of the group, as shown in FIG. 4E. The other two members of the group, Alice and Bob, can recover Diane's content key 530 as shown in FIG. 4F using their respective public keys 570 and 580 (FIG. 4C).

Figure 4G:
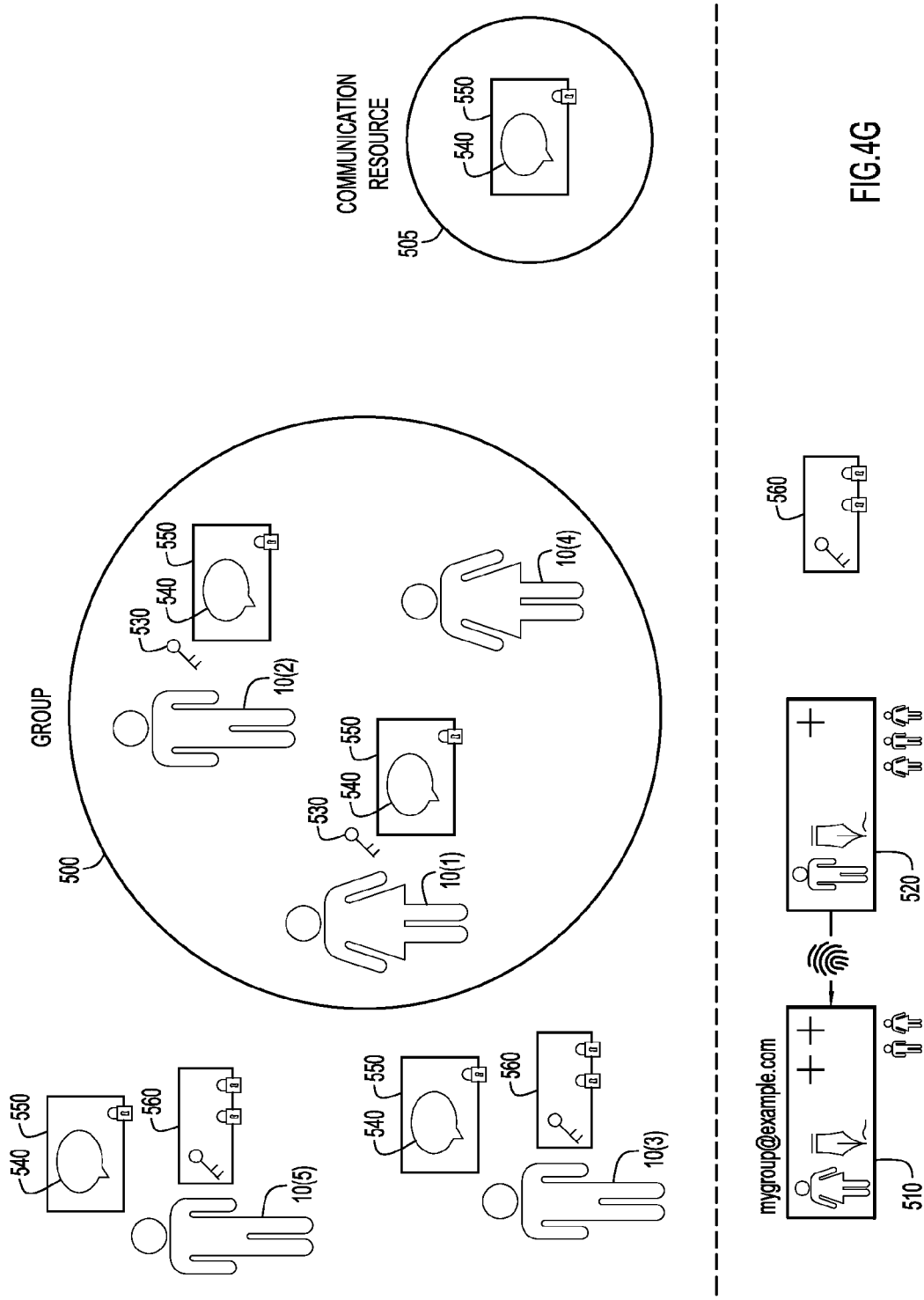
Figure 4I:
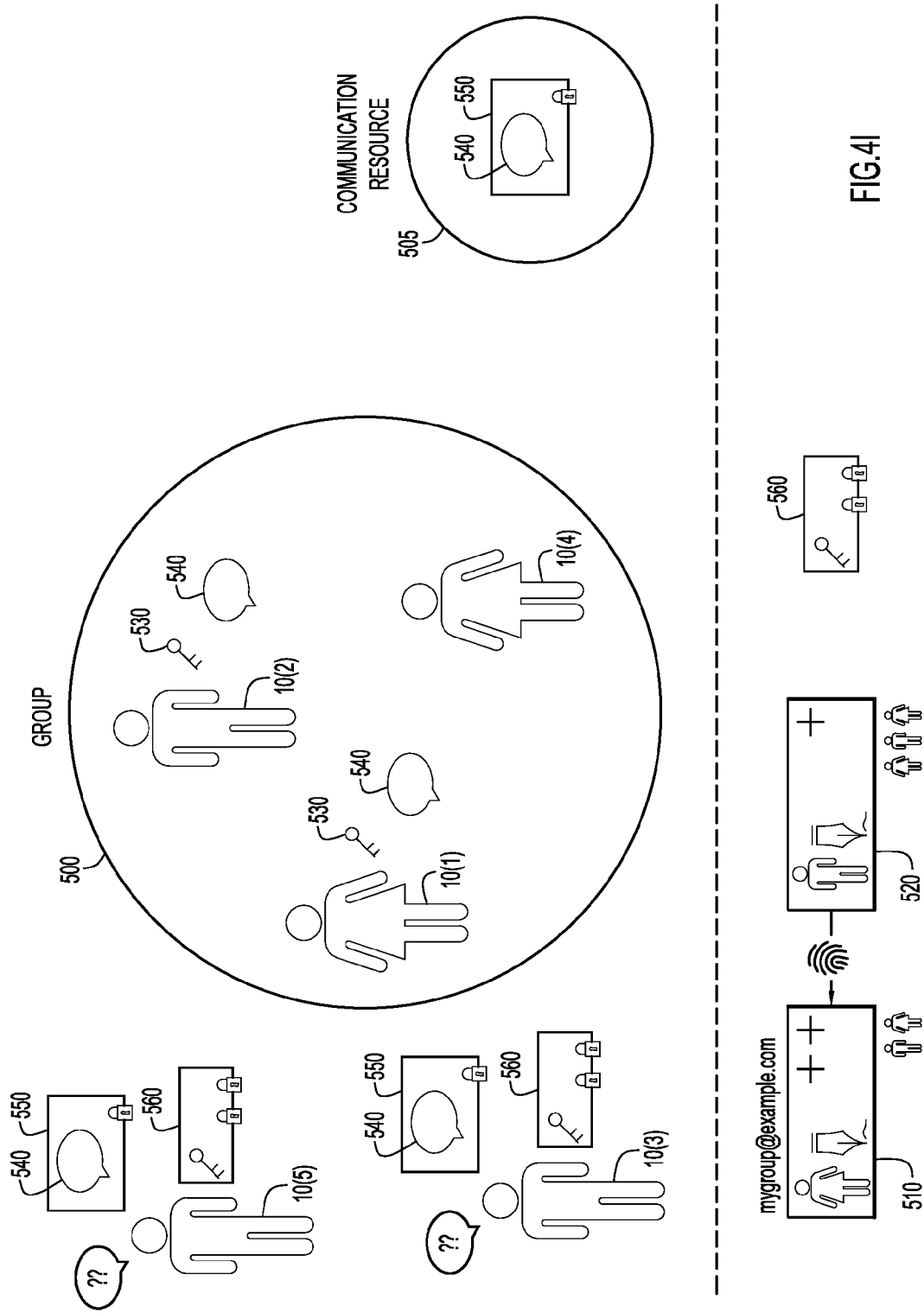

Since Alice and Bob can recover Diane's content key 540, then Alice and Bob can decrypt the encrypted content that Diane made available to the communication resource, assuming Alice and Bob have access to that communication resource, as shown in FIGS. 4G and 4H. Conversely, the non-members of the group, even if they can get access to Diane's encrypted content, cannot obtain access to it as shown in FIG. 4I, because they do not have a public key that allows for access to the content key that Diane used to form the GK, as described in connection with FIG. 4C.

In summary, in a decentralized model, the GK represents a symmetric key wrapped in a multi-recipient JWE as described in RFC7516. This involves the encryption of that symmetric key with a symmetric "Content Key", which is then itself encrypted multiple times (once each with the public entity key of each group member) producing multiple "JWE Encrypted Keys". The JWE is then composed such that the ciphertext represents the encrypted symmetric key and each of the JWE Encrypted Keys are represented as elements of the recipients attribute of the general JWE JSON serialization described in RFC7516, section 7.2.1.

In all intended use cases, each entity is represented by a unique entity public key and is in sole possession of the corresponding private key.

The techniques presented herein are not limited to any specific mechanisms by which GMBC or GK objects are distributed among participating entities. Rather, these objects are protocol and application-independent objects with cryptographic properties that make them suitable as primitives in the development of various modes of both centralized and decentralized confidential group communications.

Figure 5:
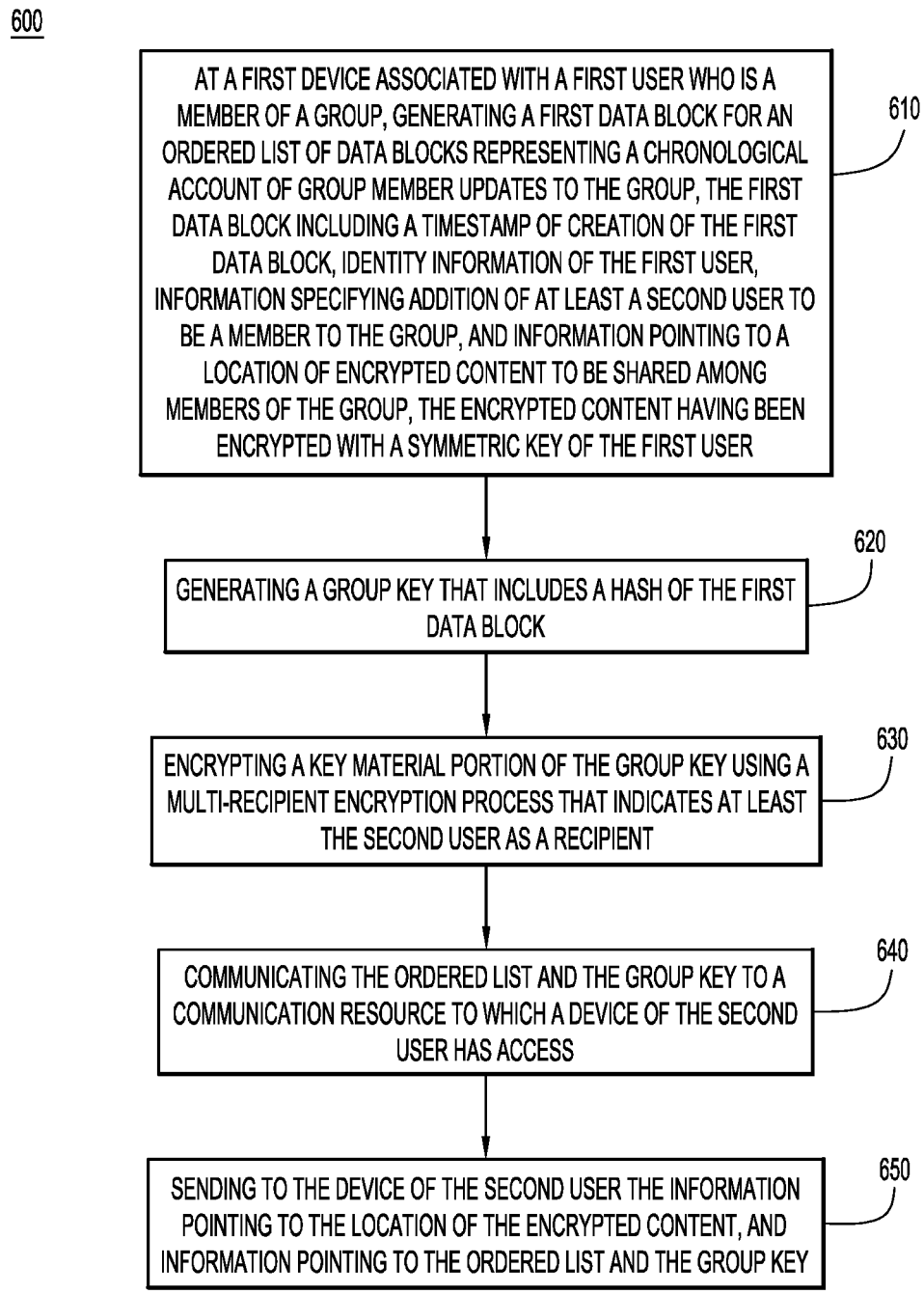
FIG. 5 is a flow chart of a method for enabling confidential communications among a group of users, according to an example embodiment.

FIG. 5 is a flow chart of a method 600 to enable confidential communication among users who are members of a group according to the techniques described above in connection with FIGS. 1A-4I. At 610, at a first device associated with a first user who is a member of a group, a first data block is generated for an ordered list of data blocks representing a chronological account of group member updates to the group, the first data block including a timestamp of creation of the first data block, identity information of the first user, information specifying addition of at least a second user to be a member to the group, and information pointing to a location of encrypted content to be shared among members of the group, the encrypted content having been encrypted with a symmetric key of the first user. At 620, a group key is generated that includes a hash of the first data block. At 630, a key material portion of the group key is generated using a multi-recipient encryption process that indicates at least the second user as a recipient. At 640, the ordered list and the group key are communicated to a communication resource (e.g., a file server) to which a device of the second user has access. At 650, the information pointing to the location of the encrypted content and information pointing to the ordered list and the group key are sent to the device of the second user.

Further to the steps of the basic method 600 shown in FIG. 5, at the device of the second user, a second data block is generated to be appended to the order list, the second data block including a timestamp of creation of the second data block, a hash of the first data block in the ordered list, and information indicating addition of at least a third user as a new member to the group and/or information indicating removal of at least one user who is an existing member of the group. The second data block is sent to a device of the third user. The device of the third user may also create another data block that includes information indicating addition of at least one other user to be a new member and/or information indicating removal of at least one user who is an existing member. Moreover, the device of the third user may validate the ordered list by: verifying signatures of each data block in the ordered list; verifying that each data block contains a valid hash of a preceding data block in the ordered list; and verifying that each data block in the ordered list was created and signed by a member of the group.

As described above, in one embodiment, each data block is a JavaScript Object Notation (JSON) object signed with a private key at the device of the user that created that data block. The JSON object may include includes attributes representing: a Uniform Resource Indicator (URI) of the user that created the data block, an array of group membership update operations, a timestamp for creation of the data block, and a hash of a preceding data block in the ordered list. A group membership update operation may be indicated in the JSON object with a field containing a tag indicating an add operation or a remove operation, and a URI of an entity being added to the group or removed from the group.

The method 600 may further include, as described above, the device of the second user may perform the additional operations of: receiving the information pointing to the location of the encrypted content, the ordered list and the group key; determining that the first user is trusted based on the identity information of the first user; if it is determined that the first user is trusted, retrieving the ordered list and the group key using the information pointing to the ordered list and the group key; and verifying signatures of the first data block and the group key by discovering and retrieving a public key of the first user. The device of the second user may further: decrypt the key material portion of the group key using a private key of the second user; obtain the encrypted content indicated by the information pointing to the location of the encrypted content in the first data block; and decrypt the encrypted content.

Generating the group key may include encrypting the symmetric key of the first user with a private content key to produce an encrypted symmetric key, encrypting the encrypted symmetric key with each public key of the at least two other members of the group to produce a plurality of JavaScript Object Notation Web Encryption (JWE) encrypted keys.

As described above in connection with FIGS. 3A-3C, in an arbitrary group of users, (e.g., first, second, third, fourth, users, etc.), at a device of a fourth user, operations may be performed to resolve a conflict between two GMBCs by: receiving from the device of the third user information for at least first and second ordered lists of data blocks that have in common the second data block but which first and second ordered lists have two different third data blocks subsequent to the second data block; and selecting between the two different third data blocks bashed on hash values of the two different third data blocks, respectively. The selecting operation may involve selecting between the two different third data blocks based on which of the two different third data blocks has a numerically smallest hash value.

FIG. 6 illustrates a block diagram a system 700 that includes a plurality of devices 710(1)-710(N) that are configured to perform the operations described herein. The devices 710(1)-710(N) may communication with each other via a network 705. In addition, examples of communication resources shown in FIG. 6 include a file server 707(1), instant messaging server 707(2), online meeting server 707 (3) and email server 707(4). As explained above, the devices 710(1)-710(N) may take any of a variety of forms, such as a desktop computer, laptop computer, tablet, mobile device, server computer, application running in a datacenter/cloud computing environment, virtual machine, etc. An example of the make-up of one of the devices 710(1) is shown in FIG. 6 and this is meant to be generally representative of any of the other devices 710(2)-710(N). In one example, each device includes a processor (or multiple processors 720, memory 730, a network interface unit 740, a keyboard 750, and a display 760. The processor 710 may be a microprocessor or microcontroller. The network interface unit 740 may be a wired or wireless network interface unit (card) that enables communication over a network or multiple networks.

The memory 730 stores software instructions for GMBC process logic 770 and GK process logic 780. When the processor 720 executes the software instructions for the group member process logic 770, it is operable to perform the operations described herein in connection with FIGS. 1A-5. The memory 730 may include read only memory (ROM), random access memory (RAM), magnetic disk storage media devices, optical storage media devices, flash memory devices, electrical, optical, or other physical/tangible memory storage devices. Thus, in general, the memory may comprise one or more tangible (non-transitory) computer readable storage media (e.g., a memory device) encoded with software comprising computer executable instructions and when the software is executed (by the controller) it is operable to perform the operations described herein.

In another form, the operations described herein may be implemented in hardware, such as in an application specific integrated circuit (ASIC), programmable gate array, etc.

In summary, presented herein is a method for achieving authorization in confidential group communications in terms of an ordered list of data blocks representing a tamper-resistant chronological account of group membership updates. This method permits ad-hoc and decentralized group definition, dynamic and decentralized membership updates, open sharing, tamper resistance, and tracking of membership history. There are many applications of these techniques. One such application is enabling end-to-end encryption of instant messaging, content sharing, and streamed media. This is useful in developing a protocol or application designed to enable confidential group communications.

These techniques do not propose but rather presume an existing mechanism for obtaining and verifying the public keys of entities identified within the block chain. Specifically, given a URI that identifies an entity as a GMBC block creator, curator, or member entity, a means by which others may discover and authenticate that entity's public key is used.

That mechanism could be, but is not limited to, the WebFinger protocol extension, such as that described in draft-miller-saag-key-discovery-00 (https://tools.ietf.org/html/draft-miller-saag-keydiscovery-00), non-standard or proprietary public key discovery protocols, and pre-provisioning of entity public keys in a trusted public, site, or local key store.

Thus, in one form, a method is provided to enable confidential communication among users who are members of a group, the method comprising: at a first device associated with a first user who is a member of the group: generating a first data block for an ordered list of data blocks representing a chronological account of group member updates to the group, the first data block including a timestamp of creation of the first data block, identity information of the first user, information specifying addition of at least a second user to be a member to the group, and information pointing to a location of encrypted content to be shared among members of the group, the encrypted content having been encrypted with a symmetric key of the first user; generating a group key that includes a hash of the first data block; encrypting a key material portion of the group key using a multi-recipient encryption process that indicates at least the second user as a recipient; communicating the ordered list and the group key to a communication resource to which a device of the second user has access; and sending to the device of the second user the information pointing to the location of the encrypted content, and information pointing to the ordered list and the group key.

In another form, an apparatus is provided comprising: a network interface unit configured to enable communications over a network to enable confidential communication among members of a group by passing an ordered list of data blocks representing a chronological account of group member updates to the group; a processor coupled to the network interface unit, wherein the processor is configured to, on behalf of a first user who is a member of the group: generate a first data block for an ordered list of data blocks representing a chronological account of group member updates to the group, the first data block including a timestamp of creation of the first data block, identity information of the first user, information specifying addition of at least a second user to be a member to the group, and information pointing to a location of encrypted content to be shared among members of the group, the encrypted content having been encrypted with a symmetric key of the first user; generate a group key that includes a hash of the first data block; encrypt a key material portion of the group key using a multi-recipient encryption process that indicates at least the second user as a recipient; communicate the ordered list and the group key to a communication resource to which a device of the second user has access; and send to the device of the second user the information pointing to the location of the encrypted content, and information pointing to the ordered list and the group key.

In yet another form, a system is provided to enable confidential communication among users who are members of a group, the system comprising: a first device associated with a first user who is a member of the group; a second device associated with a second user who is a member of the group; wherein the first device is configured to: generate a first data block for an ordered list of data blocks representing a chronological account of group member updates to the group, the first data block including a timestamp of creation of the first data block, identity information of the first user, information specifying addition of at least a second user to be a member to the group, and information pointing to a location of encrypted content to be shared among members of the group, the encrypted content having been encrypted with a symmetric key of the first user; generate a group key that includes a hash of the first data block; encrypt a key material portion of the group key using a multi-recipient encryption process that indicates at least the second user as a recipient; communicate the ordered list and the group key to a communication resource to which a device of the second user has access; and send to the device of the second user the information pointing to the location of the encrypted content, and information pointing to the ordered list and the group key.

In still another form, one or more non-transitory computer readable storage media are provided, encoded with instructions that, when executed by a processor of a first device of a first user, cause the processor to: at the first device associated with the first user who is a member of the group: generate a first data block for an ordered list of data blocks representing a chronological account of group member updates to the group, the first data block including a timestamp of creation of the first data block, identity information of the first user, information specifying addition of at least a second user to be a member to the group, and information pointing to a location of encrypted content to be shared among members of the group, the encrypted content having been encrypted with a symmetric key of the first user; generate a group key that includes a hash of the first data block; encrypt a key material portion of the group key using a multi-recipient encryption process that indicates at least the second user as a recipient; communicate the ordered list and the group key to a communication resource to which a device of the second user has access; and send to the device of the second user the information pointing to the location of the encrypted content, and information pointing to the ordered list and the group key.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method to enable confidential communication among users who are members of a group, the method comprising:
    at a first device associated with a first user who is a member of the group:
        generating a first data block for an ordered list of data blocks representing a chronological account of group member updates to the group, the first data block including identity information of the first user, information specifying addition of at least a second user to be a member to the group, and information pointing to a location of encrypted content to be shared among members of the group, the encrypted content having been encrypted with a symmetric key of the first user;
        generating a group key that includes a hash of the first data block;
        encrypting a key material portion of the group key using a multi-recipient encryption process that indicates at least the second user as a recipient;
        communicating the ordered list and the group key to a communication resource to which a second device of the second user has access; and
        sending to the second device of the second user the information pointing to the location of the encrypted content, and information pointing to the ordered list and the group key;
    at the second device associated with the second user:
        receiving the information pointing to the location of the encrypted content, the ordered list and the group key;
        determining whether the first user is trusted based on the identity information of the first user;
        when it is determined that the first user is trusted, retrieving the ordered list and the group key using the information pointing to the ordered list and the group key; and verifying signatures of the first data block and the group key by discovering and retrieving a public key of the first user.

2. The method of claim 1, further comprising, at the device of the second user:
    generating a second data block to be appended to the order list, the second data block including a timestamp of creation of the second data block, a hash of the first data block in the ordered list, and information indicating addition of at least a third user as a new member to the group and/or information indicating removal of at least one user who is an existing member of the group; and
    sending the second data block to a device of the third user.

3. The method of claim 2, further comprising, at the device of the third user, validating the ordered list by:
    verifying signatures of each data block in the ordered list;
    verifying that each data block contains a valid hash of a preceding data block in the ordered list; and
    verifying that each data block in the ordered list was created and signed by a member of the group.

4. The method of claim 2, wherein each data block comprises a JavaScript Object Notation (JSON) object signed with a private key at the device of the user that created that data block.

5. The method of claim 4, wherein the JSON object includes attributes representing: a Uniform Resource Indicator (URI) of the user that created the data block, an array of group membership update operations, and a hash of a preceding data block in the ordered list.

6. The method of claim 5, wherein a group membership update operation is indicated in the JSON object with a field containing a tag indicating an add operation or a remove operation, and a URI of an entity being added to the group or removed from the group.

7. The method of claim 5, wherein the first data block in the ordered list includes a nonce and URI that uniquely identifies the communication resource.

8. The method of claim 2, further comprising at a device of a fourth user:
   receiving from the device of the third user information for at least first and second ordered lists of data blocks that have in common the second data block but which first and second ordered lists have two different third data blocks subsequent to the second data block; and
   selecting between the two different third data blocks bashed on hash values of the two different third data blocks, respectively.

9. The method of claim 8, wherein selecting comprises selecting between the two different third data blocks based on which of the two different third data blocks has a numerically smallest hash value.

10. The method of claim 1, further comprising, at the device of the second user:
    decrypting the key material portion of the group key using a private key of the second user;
    obtaining the encrypted content indicated by the information pointing to the location of the encrypted content in the first data block; and
    decrypting the encrypted content.

11. The method of claim 1, generating the group key comprises encrypting the symmetric key of the first user with a private content key to produce an encrypted symmetric key, encrypting the encrypted symmetric key with each public key of the at least two other members of the group to produce a plurality of JavaScript Object Notation Web Encryption (JWE) encrypted keys.

12. An apparatus comprising:
    a network interface unit configured to enable communications over a network to enable confidential communication among members of a group by passing an ordered list of data blocks representing a chronological account of group member updates to the group;
    a microprocessor coupled to the network interface unit, wherein the microprocessor is configured to, on behalf of a second user who is a member of the group that includes a first user:
        receive from a device of the first user information pointing to a location of encrypted content, the ordered list of data blocks and a group key, the encrypted content having been encrypted with a symmetric key of the first user, a first data block for the ordered list of data blocks including identity information of the first user, information specifying addition of at least the second user to be a member to the group, the group key having been generated to include a hash of the first data block, and a key material portion of the group key having been encrypted using a multi-recipient encryption process that indicates at least the second user as a recipient;
        determine whether the first user is trusted based on the identity information of the first user;
        when it is determined that the first user is trusted, retrieve the ordered list and the group key using the information pointing to the ordered list and the group key; and
        verify signatures of the first data block and the group key by discovering and retrieving a public key of the first user.

13. The apparatus of claim 12, wherein the microprocessor is configured to:
    generate a second data block to be appended to the ordered list, the second data block including a hash of the first data block in the ordered list, and information indicating addition of at least a third user as a new member to the group and/or information indicating removal of at least one user who is an existing member of the group; and
    send the second data block to a device of the third user.

14. The apparatus of claim 13, wherein each data block comprises a JavaScript Object Notation (JSON) object signed with a private key at the device of the user that created that data block.

15. The apparatus of claim 14, wherein the JSON object includes attributes representing: a Uniform Resource Indicator (URI) of the user that created the data block, an array of group membership update operations, and a hash of a preceding data block in the ordered list.

16. The apparatus of claim 15, wherein a group membership update operation is indicated in the JSON object with a field containing a tag indicating an add operation or a remove operation, and a URI of an entity being added to the group or removed from the group.

17. One or more non-transitory computer readable storage media encoded with instructions that, when executed by a processor, cause the processor to perform operations on behalf of a second user who is a member of a group that includes a first user, the operations including:
    receiving from a device of the first user information pointing to a location of encrypted content, the ordered list of data blocks representing a chronological account of group member updates to the group and a group key, the encrypted content having been encrypted with a symmetric key of the first user, a first data block for the ordered list of data blocks including identity information of the first user, information specifying addition of at least the second user to be a member to the group, the group key having been generated to include a hash of the first data block, and a key material portion of the group key having been encrypted using a multi-recipient encryption process that indicates at least the second user as a recipient;
    determining whether the first user is trusted based on the identity information of the first user;
    when it is determined that the first user is trusted, retrieving the ordered list and the group key using the information pointing to the ordered list and the group key; and
    verifying signatures of the first data block and the group key by discovering and retrieving a public key of the first user.

18. The computer readable storage media of claim 17, further comprising instructions that cause the processor to perform operations including:
    generating a second data block to be appended to the ordered list, the second data block including a timestamp of creation of the second data block, a hash of the first data block in the ordered list, and information indicating addition of at least a third user as a new member to the group and/or information indicating removal of at least one user who is an existing member of the group; and sending the second data block to a third device of the third user.

19. The computer readable storage media of claim 18, wherein each data block comprises a JavaScript Object Notation (JSON) object signed with a private key at the device of the user that created that data block.

20. The computer readable storage media of claim 19, wherein the JSON object includes attributes representing: a Uniform Resource Indicator (URI) of the user that created the data block, an array of group membership update operations, and a hash of a preceding data block in the ordered list.

* * * * *